USOO5634060A

United States Patent [19]
Jennings

[11] Patent Number: 5,634,060
[45] Date of Patent: May 27, 1997

[54] METHOD AND APPARATUS FOR HIGH-SPEED EFFICIENT BI-DIRECTIONAL COMMUNICATION BETWEEN MULTIPLE PROCESSOR OVER A COMMON BUS

[75] Inventor: Kevin F. Jennings, Novi, Mich.

[73] Assignee: Unisys Corporation, Blue Bell, Pa.

[21] Appl. No.: 287,878

[22] Filed: Aug. 9, 1994

[51] Int. Cl.$^6$ .................................................. G06F 13/362
[52] U.S. Cl. ............................................ 395/729; 395/293
[58] Field of Search .................................. 395/287–298, 395/728–732

[56] References Cited

U.S. PATENT DOCUMENTS

| | | | |
|---|---|---|---|
| 3,925,766 | 12/1975 | Bardotti et al. | 395/732 |
| 4,481,572 | 11/1984 | Ochsner | 395/297 |
| 4,595,911 | 6/1986 | Kregness et al. | 340/347 |
| 4,722,072 | 1/1988 | Price | 395/732 |
| 4,829,467 | 5/1989 | Ogata | 395/732 |
| 4,933,901 | 6/1990 | Tai et al. | 365/189.07 |
| 4,956,820 | 9/1990 | Hashimoto | 365/222 |
| 4,959,282 | 9/1990 | Tulpule et al. | 395/728 |
| 5,179,705 | 1/1993 | Kent | 395/729 |
| 5,195,185 | 3/1993 | Maremom | 395/325 |
| 5,202,966 | 4/1993 | Woodson | 395/325 |
| 5,255,375 | 10/1993 | Crook et al. | 395/325 |
| 5,303,382 | 4/1994 | Buch et al. | 395/732 |
| 5,327,538 | 7/1994 | Hamaguchi | 395/287 |
| 5,444,847 | 8/1995 | Iitsuka | 395/287 |

*Primary Examiner*—Jack B. Harvey
*Assistant Examiner*—Paul R. Myers
*Attorney, Agent, or Firm*—Nawrocki, Rooney & Sivertson, P.A.

[57] ABSTRACT

An apparatus for and method of granting access to a shared resource wherein the shared resource is accessed by a plurality of users. In a first exemplary embodiment of the present invention, a priority controller can assign priority to a number of users based upon the combination of shared resource request signals received by the priority controller. For each combination of shared resource request signals, a different priority may be assigned to each user by the priority controller. In another exemplary embodiment of the present invention, each user may supply additional information bits to the priority controller to indicate a "requested priority" for a the shared resource. The priority controller then weighs the priority requests from each user, including the additional information bits, and determines an optimum priority assignment. That is, the users themselves may influence the priority assigned thereto by providing the additional information bits to the priority controller.

28 Claims, 16 Drawing Sheets

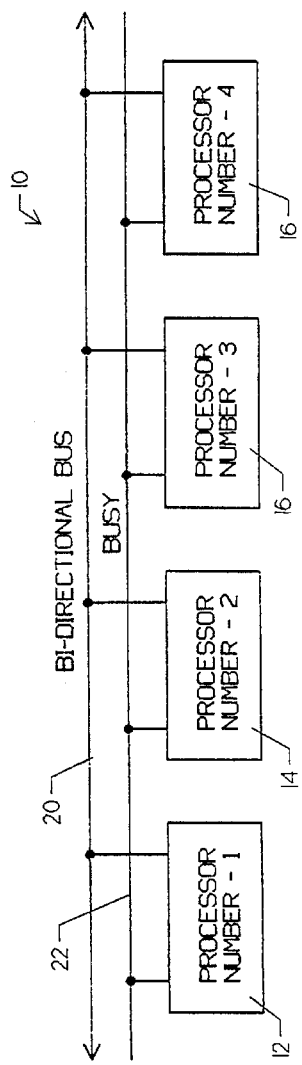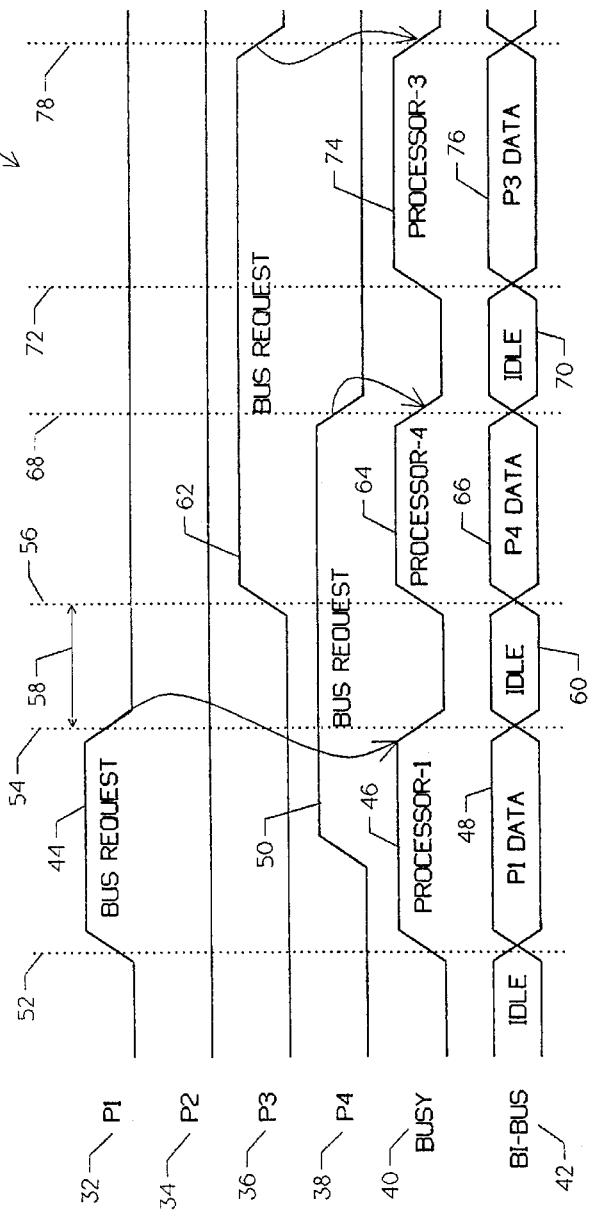

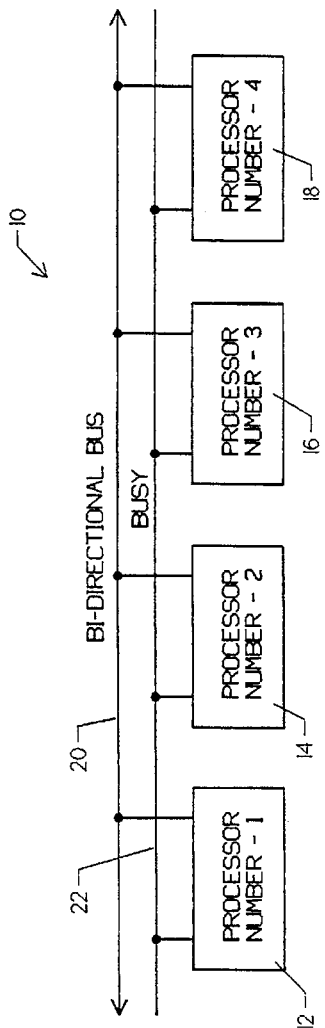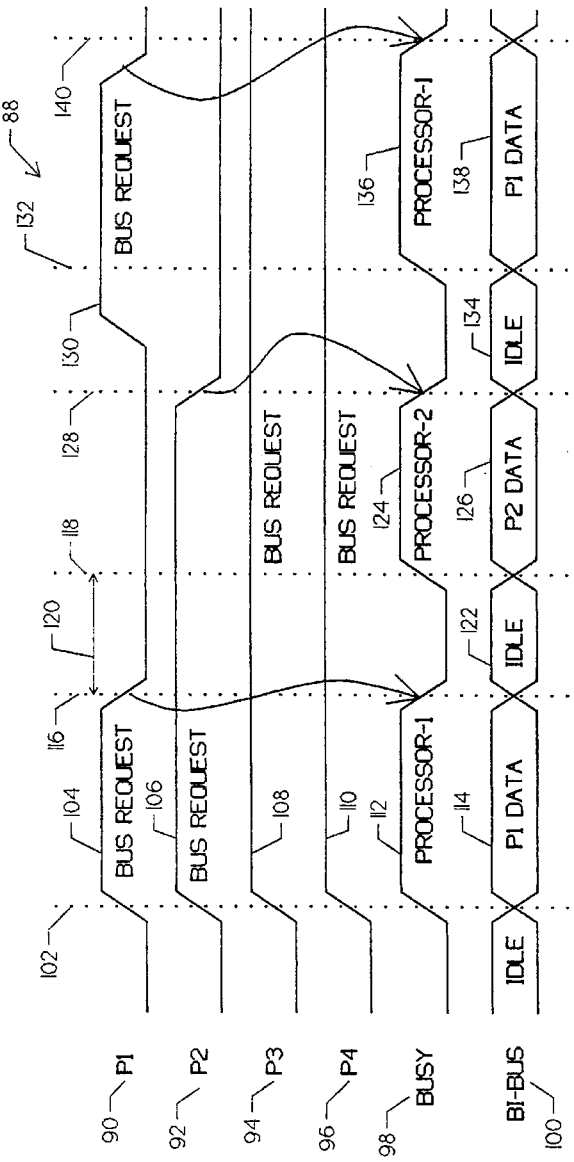
FIG. 2A PRIOR ART
FIG. 2B PRIOR ART

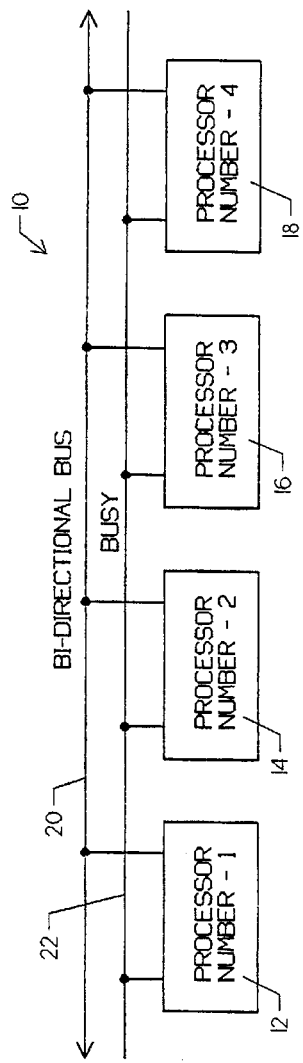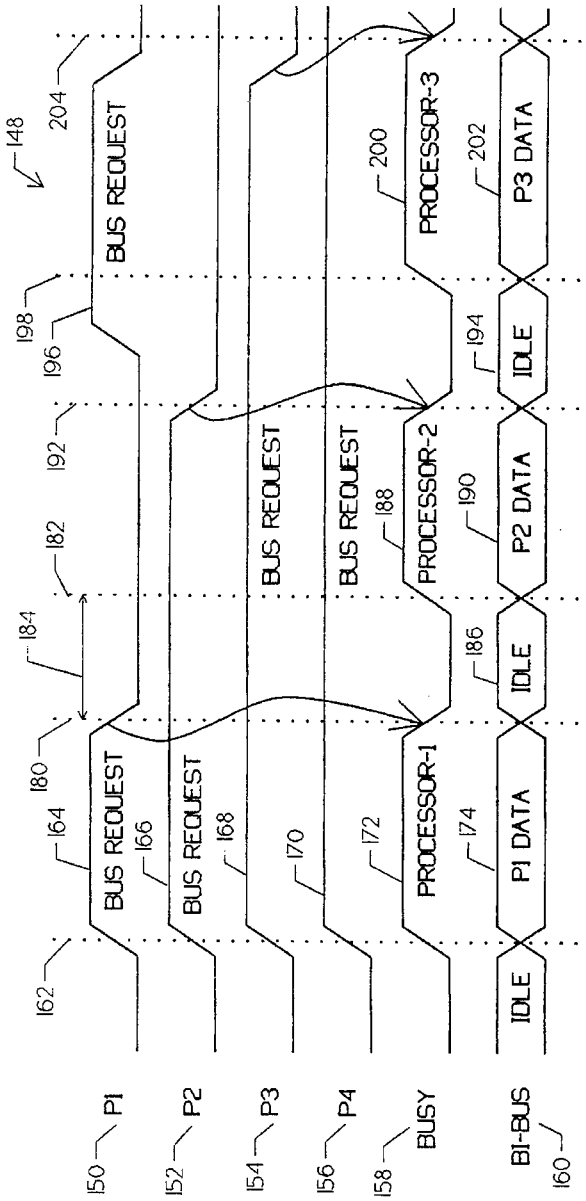

PRIOR ART

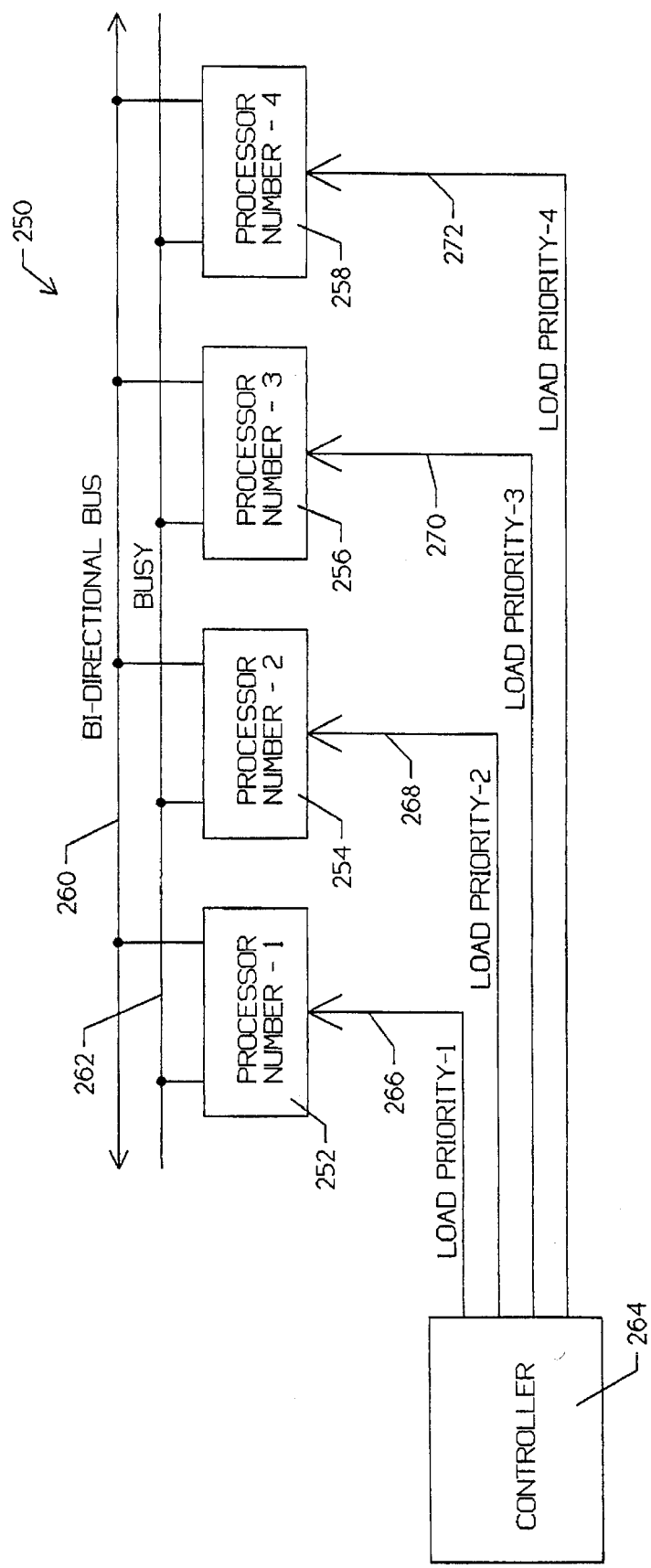

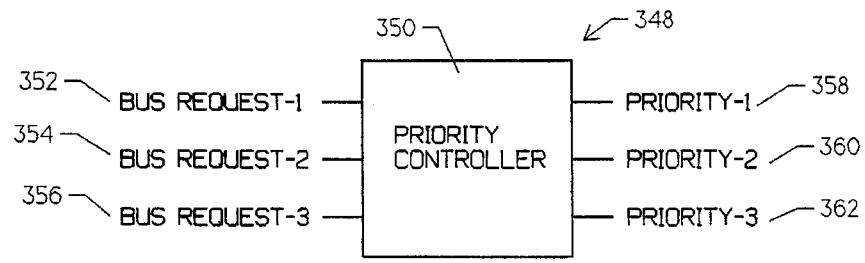
FIG. 8A
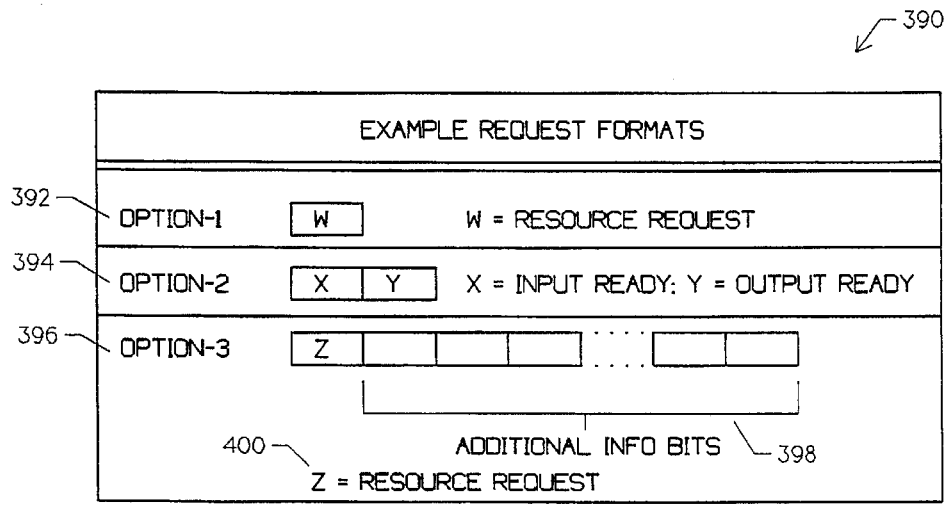
FIG. 8B
FIG. 8C

IF USER-3 HAS OUTPUT READY AND USER-4 HAS INPUT READY THEN
    SET READ TO USER-3 AND WRITE TO USER-4
ELSE IF USER-4 HAS OUTPUT READY AND USER-3 HAS INPUT READY THEN
    SET READ TO USER-4 AND WRITE TO USER-3.

*592

| ADDRESS RANGE | DATA |
|---|---|
| 000000000-100011111 | 000000000 |
| 100100000-100111111 | 010100000 |
| 101000000-101011111 | 000000000 |
| 101100000-101111111 | 010100000 |
| 110000000-110011111 | 000000000 |
| 110100000-110111111 | 010100000 |
| 111000000-111011111 | 000000000 |
| 111100000-111111111 | 010100000 |

*600

| ADDRESS RANGE | DATA |
|---|---|
| 000000000-010111111 | 000000000 |
| 011000000-011111111 | 101000000 |
| 100000000-110111111 | 000000000 |
| 111000000-111111111 | 101000000 |

| ADDRESS RANGE | DATA |
|---|---|
| 000000000-010111111 | 000000000 |
| 011000000-011111111 | 101000000 |
| 100000000-100011111 | 000000000 |
| 100100000-100111111 | 010100000 |
| 101000000-101011111 | 000000000 |
| 101100000-101111111 | 010100000 |
| 110000000-110011111 | 000000000 |
| 110100000-110111111 | 010100000 |
| 111000000-111011111 | 101000000 |
| 111100000-111111111 | 010100000 |

FIG. 11D

METHOD AND APPARATUS FOR HIGH-SPEED EFFICIENT BI-DIRECTIONAL COMMUNICATION BETWEEN MULTIPLE PROCESSOR OVER A COMMON BUS

CROSS REFERENCE TO CO-PENDING APPLICATIONS

None.

BACKGROUND OF THE INVENTION

1. Field of the Invention

The present invention generally relates to general purpose digital data processing systems and more particularly relates to such systems which employ a priority scheme for allocating a shared resource between a number of independent users.

2. Description of the Prior Art

In most general purpose, stored program, digital computers, it is desirable to have shared resources contained therein. Each of the shared resources may be designed to service a number of users. Possible shared resources may include a bus, a memory, a processor, or any other element within the computer system. The concept of utilizing shared resources has been used for several years to decrease the number of components within a computer system thereby increasing the cost effectiveness of the system. The use of shared resources also reduces the overall size and power requirements of the computer system.

Although these benefits can be substantial, shared resources may reduce the band pass of a system if not carefully used and designed. One reason for this is that only one of the users may use the shared resource at any given time. That is, the users must "share" the resource. Consistent therewith, computer designers must weigh the advantage of using a shared resource against the band pass limiting effect inherent therein. To increase the number of applications for shared resources and thus to take advantage of the benefits attributable thereto, computer designers have attempted to increase the band pass of shared resource designs.

One method for increases the overall band pass of a shared resource design is to utilize priority schemes. For example, in a typical system, a number of processors may communicate with one another across a shared bi-directional bus. However, only one processors may use the shared bus at any given time. Therefore, the computer system must employ a mechanism for ensuring that only one processor has access to the shared bus at any given time while blocking access of the remaining processors. Often, one or more of the processors may have a greater need to access the shared bus. One reasons for this may be that one or more of the processors may be in the critical path of the computer system. If a processor is in the critical path of a computer system and it is not allowed to access the shared resource, the band pass of the entire computer system may suffer. A concrete example of this may be that a first of the processors connected to a shared bus may contain a memory therein for storing instructions which must be accessed by a main processor. A second of the processors connected to the shared bus may be responsible for controlling the IO ports connected to a printer. It is clear that the first processor should be given priority to use the shared bus over the second processor. If this is not the case, the "band pass" of the computer system may be reduced because the second processor may have control of the bus thereby prohibiting the main processor from fetching instructions from the first processor. This is just an example of where priority schemes are essential to proper operation of modern computer systems.

One scheme advanced for solving this problem is a pure "first-in-time" priority scheme. In a pure first-in-time priority scheme, each of the processors that are coupled to the shared bus may assert a bus request signal when the corresponding processor wants to use the shared bus. The first processor that asserts the corresponding bus request signal is given priority and control over the shared bus. If a second processor asserts it's corresponding bus request signal after the first processor has control over the bus, the second processor is denied access to the shared bus. After the first processor releases control of the bus, each processor is given another opportunity to obtain control of the bus by asserting it's corresponding bus request signal. This process is repeated during normal operation of the computer system.

It is evident that one or more of the processors coupled to the shared resource may be effectively blocked from using the shared resource for an extended period of time. If one of these processors is in the critical path of the computer system, the band pass of the computer system may suffer. In addition, all of the processors that are coupled to the shared resource are given an equal opportunity to access the shared resource every time the shared resource is released by a processor. That is, even the processor that previously had control of the shared resource has an equal opportunity to gain control of the shared resource during the next cycle. Because of the inherent disadvantages of the pure first-in-time scheme described hereinabove, only applications that are non-bandpass limited typically use the pure first-in-time scheme. However, in these applications, the pure first-in-time scheme has the advantage of being simple to implement thereby not requiring much overhead circuitry.

A modified first-in-time scheme has been developed to reduce some of the disadvantages inherent in the pure first-in-time scheme. The modified first-in-time scheme does not allow the processor that previously had control of the shared resource to gain control of the shared resource during the next succeeding bus cycle. This modification prohibits one processor from dominating a shared resource over an extended period of time. One disadvantage of the modified first-in-time scheme is that two or more processors may still dominate a shared resource thereby effectively blocking other processors from accessing the shared resource. For this to occur, however, the two or more processors must alternate in controlling the shared resource thereby giving access to at least two of the processors coupled thereto.

In some applications, it is important that each of the users that are coupled to a shared resource be given an opportunity to access the shared resource on a periodic basis. The modified first-in-time scheme may include circuitry to prohibit a user that previously had control of the shared resource to gain control of the shared resource during the next "N" succeeding bus cycles where N equals the number of users connected to the shared resource. In this configuration, the modified first-in-time scheme may allow all users access to the shared resource on a periodic basis.

Another priority scheme is termed the "first-in-place" scheme. The first-in-place scheme assigns a priority to each of the users connected to a shared resource. Each time an access to the shared resource is requested, the user having the highest priority assigned thereto is given access to the shared resource. For example, if a user having a priority of "2" and a user having a priority of "5" both request access to the shared resource, the first-in-place scheme will grant access to the user having the highest priority, namely the user having a priority of "2". Therefore, the users are assigned a priority value and are serviced in an order that is consistent with that value. Typically, the values assigned to the users are fixed and cannot be changed. A disadvantage of the first-in-place scheme is that the highest priority user may dominate the shared resource thereby effectively blocking access to lower priority users for extended periods of time.

One method for improving the first-in-place scheme is to rotate the assigned priority values among the users on a periodic basis. For example, a user having a priority value of "2" may be assigned a priority value of "1" and a user having a priority value of "3" may be assigned a priority value of "2". Therefore, each user is assigned a new priority value in a round robin fashion thus allowing access to the shared resource by all users on a periodic basis.

A similar approach is suggested in U.S. Pat. No. 5,195,185, issued on Mar. 16, 1993 to Marenin. Marenin suggests providing a separate processor which independently changes the priority values of all users. That is, Marenin suggests having the ability to change the priority value assigned to each user whenever the separate processor independently determines that it is necessary.

Although Marenin provides some additional flexibility to the first-in-place schemes, significant disadvantages still remain. First, the priority values of the users can only be changed at the direction of an independent processor which is not otherwise coupled to the users. Therefore, the separate processor must independently determine when a priority change should occur without regard to the current status of the users. Second, the separate processor can only load new priority values into the users at predetermined intervals. Between these intervals, the operation of the apparatus suggested in Marenin operates in the same manner as the first-in-place scheme described above.

A technique used to enhance the effectiveness of the above described priority schemes is known as the "snapshot" technique. The snapshot technique captures the status of the resource requests signals provided by the users at a predetermined time. For example, at time T0 the resource request signal of a first user and a second user may be asserted while the resource request signal of a third user may not be asserted. If a "snap-shot" is taken at time T0, the values of the resource request signals at time T0 will be stored. If a first-in-place priority scheme is utilized, the users having an asserted captured resource request signal are serviced in the order of their assigned priority. In most systems employing the snap-shot technique, all of the users that have an asserted captured resource request signal are serviced in the order of their assigned priority before another snap-shot is taken. That is, users that did not have an asserted resource request signal when the previous snap-shot was taken are not allowed to access the shared resource until the next snap-shot is taken. Variations on this approach include time-shifting the snap-shot to favor one user over another.

Although the snap-shot technique may improve the effectiveness of some of the priority schemes described above, the snap-shot technique is limited by the inherent shortcomings of the underlying priority schemes.

SUMMARY OF THE INVENTION

The present invention overcomes many of the disadvantages of the prior art by providing a priority scheme which allows greater flexibility in determining the priority of a particular user than the prior art systems described above.

In a first exemplary embodiment of the present invention, a priority controller can assign priority to a number of users based upon a combination of shared resource request signals received by the priority controller. For each combination of shared resource request signals, a different priority may be assigned to each user by the priority controller.

This embodiment may be implemented by concatenating the shared resource request signals provided by the users and feeding the result into an address input of a memory device. For each combination of the shared resource request signals, a unique address location within the memory device may be accessed. The contents of the memory device may be programmed such that each combination (or address) of shared resource request signals results in a different priority assignment. The data outputs of the memory device may then be coupled to a priority input on the corresponding users. Priority may then be granted to the user having an asserted priority input provided by the memory device.

This is only an exemplary embodiment of the present invention. It is recognized that numerous other ways of implementing the present invention may exist including the use of combinational logic, PLA's, ROM's, RAM's, register files, or any other means. The present invention is inherently different than the prior art schemes because the priority assigned to a particular user is determined by a particular combination of the shared resource request signals and not by simply having a fixed priority sequence as in the first-in-place schemes. Further, it is clear that the present invention allows greater flexibility in determining the priority of a particular user than the prior art schemes described hereinabove.

In another exemplary embodiment of the present invention, each user may supply additional information bits to the priority controller to indicate a "requested priority" for a the shared resource. A priority controller may then weigh the priority requests from each user, including the additional information bits, and determine an optimum priority assignment. That is, the users themselves may influence the priority assigned thereto by providing the additional information bits to the priority controller. An advantage of this embodiment is that when a particular user has a high priority request, it has a higher probability of gaining control of the shared resource. This in turn may positively influence the bandpass of a given computer system.

This embodiment may be implemented in much the same way as the first embodiment described above. However, in this embodiment, each shared resource request signal may comprise a number of information bits rather than just a single shared resource request bit. Encoded in the information bits may be a priority request. The priority request may indicate the urgency of a particular request by a particular user. That is, if a user has an urgent need to use the shared resource, that user may indicate that urgency in the information bits. As in the first embodiment, the shared resource request signals of the users, including the information bits, may be concatenated together to form an address for a memory device. For each combination of the shared resource request signals, a unique address location within the memory device may be accessed. The contents of the memory device may be programmed such that each combination (or address) of shared resource request signals, including information bits, results in a different priority assignment. The data outputs of the memory device may then be coupled to a priority input on the corresponding users. Priority may then be granted to the user having an asserted priority input provided by the memory device.

This is only an exemplary embodiment of the present invention. It is recognized that numerous other ways of implementing the present invention may exist including the use of combinational logic, PLA's, ROM's, RAM's, register files, or any other means.

The present invention is inherently different than the prior art schemes because the priority assigned to a particular user is determined by a particular combination of the shared resource request signals, including information bits, and not by simply having a fixed priority sequence as in the first-in-place schemes. The additional information bits allow the users to influence the priority assigned thereto and may significantly increase a computer system's band pass. Finally, it is clear that the present invention allows greater flexibility in determining the priority of a particular user than the prior art schemes described above.

In another exemplary embodiment of the present invention, two shared resource request signals are provided by each user. First, an input ready signal is provided which indicates that a particular user is ready to accept input data. Second, an output ready signal is provided which indicates that a particular user is ready to provide output data. The input ready signals and output ready signals provided by the users may be concatenated together and fed into an address input of a memory device. For each combination of the shared resource request signals, a unique address location within the memory device may be accessed. The contents of the memory device may be programmed such that each combination (or address) of shared resource request signals results in a different priority assignment. The data outputs of the memory device may then be coupled to a "read" input and a "write" input on a corresponding user. Write priority may then be granted to the user having an asserted "write" input and read priority may be granted to the user having an asserted "read" input.

In a preferred embodiment, the memory device is programmed to only allow valid data transfer paths. That is, the memory device may be programmed to only allow specific data paths between certain users. This may be accomplished by programming the memory device such that the read input of a first user and a write input of a second user are never simultaneously asserted if the data path from the second user to the first user is determined to be invalid. This may be advantageous because a user may not have to transmit a receiving user's address to the shared resource before transmitting data thereto. In a typical system, a sending user must transmit a receiving user's address to indicate which of the users is to receive the data. Therefore, the exemplary embodiment may reduce the time necessary to transmit data from one user to another. This is only an exemplary embodiment of the present invention. It is recognized that numerous other ways of implementing the present invention may exist including the use of combinational logic, PLA's, ROM's, RAM's, register files, or any other means.

This exemplary embodiment is inherently different than the prior art schemes because the priority assigned to a particular user is determined by a particular combination of the shared resource request signals and not by simply having a fixed priority sequence as in the first-in-place schemes. Also, the exemplary embodiment allows the priority system to define valid data paths within the system thus eliminating the need for transmitting a receiving user's address before transmitting data. Finally, it is clear that the present invention allows greater flexibility in determining the priority of a particular user than the prior art schemes described above.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1A is a schematic diagram of a number of users coupled to a shared resource; FIG. 1B is a timing diagram illustrating a first-in-time priority scheme;

FIG. 2A is a schematic diagram of a number of users coupled to a shared resource; FIG. 2B is a timing diagram illustrating a first-in-place priority scheme;

FIG. 3A is a schematic diagram of a number of users coupled to a shared resource; FIG. 3B is a timing diagram illustrating a first-in-place priority scheme coupled with a snap-shot technique;

FIG. 5 is a schematic diagram of a number of users coupled to a shared resource wherein the first-in-place priority values can be loaded into the users via an external independent controller;

FIG. 8A is a schematic diagram of a priority controller; FIG. 8B is a chart illustrating a fundamental difference between the present invention and the prior art priority schemes; FIG. 8C is a chart illustrating three exemplary data formats for the resource request signal in accordance with the present invention;

FIG. 11C is a diagram showing the first and second portions of the exemplary algorithm of FIG. 11B implemented as a program; FIG. 11D is a diagram showing the first and second portions of the exemplary algorithm of FIG. 11B combined into a single program and implemented in the memory device;

DETAILED DESCRIPTION OF THE PREFERRED EMBODIMENTS

Figures 4A, 4B:
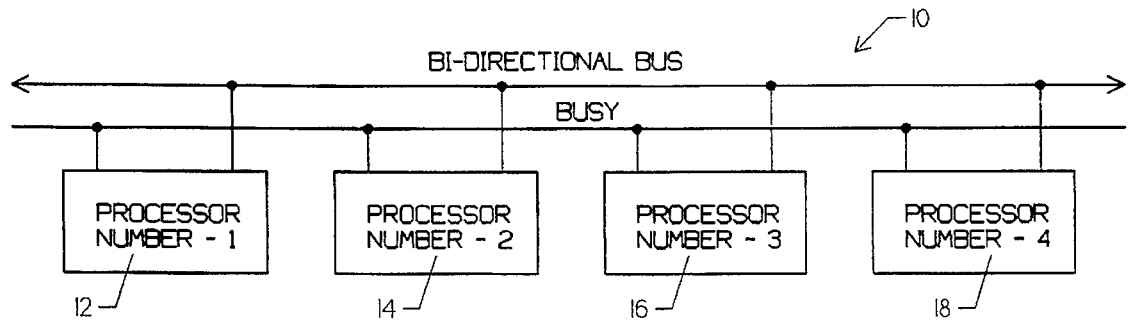
FIG. 4A is a schematic diagram of a number of users coupled to a shared resource.
FIG. 4B is a chart illustrating a rotating priority scheme.

FIG. 1A is a schematic diagram of a number of users coupled to a shared resource. The schematic diagram is generally shown at 10. Processors 12, 14, 16, and 18 each have a bi-directional data port coupled to a bi-directional bus 20. Further, processors 12, 14, 16, and 18 have a bus request port coupled to a busy bus 22. In a typical system, processors 12, 14, 16, and 18 may share the use of bi-directional bus 20. In that case, Processors 12, 14, 16, and 18 may assert their corresponding bus requests port if access to bi-directional bus 20 is desired. Only one processor may take control of bi-directional bus 20 at any given time.

FIG. 1B is a timing diagram illustrating a first-in-time priority scheme and is generally shown at 30. Signals P1 32, P2 34, P3 36, and P4 38 correspond to the bus request signals provided by processors 12, 14, 16, and 18 of FIG. 1A. Busy 40 and bi-bus 42 correspond to busy bus 22 and bi-directional bus 20 of FIG. 1A, respectively. In a first-in-time priority scheme, each of the processors that are coupled to a shared bus may assert a bus request signal when the corresponding processor wants to access the shared bus. The first processor that asserts the corresponding bus request signal is given priority and hence control over the shared bus. If a second processor asserts its corresponding bus request signal after the first processor has control of the bus, the second processor is denied access to the shared bus. When the first processor releases control of the bus, each processor is given another opportunity to obtain access of the bus by asserting its corresponding bus request signal.

Referring to FIG. 1B, at time 52, signal P1 32 is asserted by processor 12 as shown at 44. At a later time, signal P4 38 is asserted by processor 18 at shown at 50. Consistent with the first-in-time priority scheme, priority is granted to signal P1 32. As a result, busy 40 is asserted by processor 12 as shown at 46. Further, bi-bus 42 transmits the data provided by processor 12 as shown at 48. At time 54, signal P1 32 goes inactive while signal P4 38 is still asserted by processor 18. Therefore, at time 56, control of bi-directional bus 20 is granted to processor 18. Consistent therewith, busy 40 is asserted by processor 18 at time 56 as shown at 64. Similarly, signal bi-bus 42 begins transmitting data from processor 18 as shown at 66.

In a typical system, a time gap 58 may exist between the time where one processor releases control of bi-directional bus 20 and another processor gains control thereof. This results in having bi-bus 42 idle during a time gap 58 as shown at 60. More sophisticated systems attempt to minimize time gap 58 to increase the band pass of bi-directional bus 20. However, some minimum time gap 58 may be required to avoid potential bus contention problems.

Although signal P3 36 is asserted by processor 16 at time 56, control of bi-directional bus 20 is not passed to processor 16 until processor 18 releases control thereof. At time 68, signal P4 38 releases control of bi-directional bus 20. As previously stated, a time gap may exist from time 68 to time 72 resulting in bi-bus 42 being idle as shown at 70. After the time gap expires, control is passed to processor 16. Busy 40 is asserted by processor 16 at time 72 as shown at 74. Similarly, bi-bus 42 transmits data provided by processor 16 at time 72 as shown at 76. Processor 16 releases control of bi-directional bus 20 at time 78.

In a first-in-time priority scheme, the first processor that asserts its corresponding bus request signal is granted priority of bi-directional bus 20 over all other processors. This is clearly illustrated at time 52 wherein processor 12 asserts bus request signal 44 prior to processor 18 at 50. As shown at 46, control of bi-directional bus 20 is given to processor 12. Further, when processor 18 asserts signal P4 38 at 50, processor 12 already has control of bi-directional bus 20 as indicated at 44. In this situation, processor 18 is denied access to bi-directional bus 20 until processor 12 releases control of bi-directional bus 20 at time 54.

It is evident that one or more of the processors coupled to the shared resource may be effectively blocked from using the shared resource for an extended period of time. If one of the processors that is blocked is in the critical path of the computer system, the band pass of the computer system may suffer. In addition, all of the processors that are coupled to the shared resource are given an equal opportunity to access the shared resource every time the shared resource is released by a processor. That is, even the processor that previously had control of the shared resource has an equal opportunity to gain control of the shared resource during the next bus cycle. Because of the inherent disadvantages of the first-in-time scheme described hereinabove, only applications that are non-band pass limited typically use the pure first-in-time scheme. In non-band pass limited applications, the pure first-in-time scheme has the advantage of being simple to implement and may not require much overhead circuitry.

A modified first-in-time scheme has been developed to reduce some of the disadvantages inherent in the pure first-in-time scheme. The modified first-in-time scheme does not allow the processor that previously had control of the shared resource to gain control of the shared resource during the next succeeding bus cycle. This modification prohibits one processor from hogging a shared resource over an extended period of time. One disadvantage of the modified first-in-time scheme is that two or more processors may still hog the shared resource, thereby effectively blocking other processors from accessing the shared resource. For this to occur, however, the two or more processors must alternate in controlling the shared resource, thus resulting in at least two of the processors having access to the shared resource.

In some applications, it is important that each of the users that are coupled to a shared resource be given an opportunity to access the shared resource on a periodic basis. The modified first-in-time scheme may include circuitry to prohibit a user that previously had control of the shared resource to gain control of the shared recourse during the next "N" succeeding cycles where N equals the number of users connected to the shared resource. In this configuration, the modified first-in-time scheme may allow all users access to the shared resource on a periodic basis.

FIG. 2A is a schematic diagram of a number of users coupled to a shared resource. FIG. 2A is a duplicate of FIG. 1A and has been included herein for the reader's convenience. FIG. 2B is a timing diagram illustrating a first-in-place priority scheme. A first-in-place priority scheme assigns a priority to each of the users connected to a shared resource. Each time an access to the shared resource is requested, the user having the highest priority assigned thereto is given access to the shared resource. For example, if a user having a priority of "2" and a user having a priority of "4" both request access to the shared resource, the first-in-place priority scheme will grant access to the user having the highest priority, namely the user having a priority of "2". Therefore, the users are assigned a priority value and are serviced in an order that is consistent with that value. Typically, the values assigned to the users are fixed and cannot be changed. A disadvantage to the first-in-place priority schemes is that highest priority user may hog the shared resource, thereby effectively blocking access to lower priority users for extended periods of time.

Referring to FIG. 2B, signals P1 90, P2 92, P3 94, and P4 96 correspond to the bus request signals provided by processors 12, 14, 16, and 18, respectively. Busy 98 corresponds to the busy bus 22 of FIG. 2A. Similarly, bi-bus 100 corresponds to bi-directional bus 20 of FIG. 2A. FIG. 2B assumes that processor 12 has a priority of 1, processor 14 has a priority of 2, processor 16 has a priority of 3, and processor 18 has a priority of 4. At time 102, all of the processors make a bus request as shown at 104, 106, 108, and 110. Consistent with the first-in-place priority scheme, processor 12 is granted control of bi-directional bus 20. Busy 98 is asserted at time 102 by processor 12 as shown at 112. Similarly, bi-bus 100 transmits data provided by processor 12 as shown at 114. Processor 12 completes the data transfer at time 116. This is indicated by signal P1 90 going low at time 116. Since processor 14 is assigned the next highest priority, processor 14 is given control of bi-directional bus 20 at time 118. That is, busy 98 is asserted by processor 14 at time 118 as shown at 124. Similarly, bi-bus 100 transmits data provided by processor 14 at time 116 as shown at 126. Processor 14 releases control of bi-directional bus 20 at time 128. Immediately thereafter, processor 12 asserts P1 90 as shown at 130. Since processor 12 is assigned a higher priority than processors 16 and 18, processor 12 is again granted control of bi-directional bus 20 at time 132. This is despite having P3 94 and P4 96 asserted since time 102. Therefore, busy 98 is asserted by processor 12 at time 132 as shown at 136. Similarly, bi-bus 100 transmits data provided by processor 12 at time 132 as shown at 138.

FIG. 3A is a schematic diagram of a number of users coupled to a shared resource. FIG. 3A is a duplicate of FIG. 1A and is reproduced herein for the reader's convenience. FIG. 3B is a timing diagram generally shown at 148 illustrating a first-in-place priority scheme coupled with a snap-shot technique. The snap-shot technique is often used to enhance the effectiveness of the first-in-place priority scheme. The snap-shot technique captures the status of the resource request signals at a predetermined time interval. For example, at time T0 the resource request signal of a first user and a second user may be asserted while the resource request signal of a third user may not be asserted. If a "snap-shot" is taken at time T0, the values of the resource request signals at time T0 will be stored. If a first-in-place priority scheme is utilized, the users having a captured asserted resource request signal are serviced in the order of their assigned priority. In most systems employing the snap-shot technique, all of the users that have a captured asserted resource request signal are serviced in the order of their assigned priority before another snap-shot is taken. That is, users that did not have an asserted resource request signal when the snap-shot was previously taken, are not allowed to access the shared resource until the next snap-shot is taken. Variations on this approach include time-shifting the snap-shot to favor one user over another.

Referring to FIG. 3B, signals P1 150, P2 152, P3 154, and P4 156 represent the bus request signals provided by processors 12, 14, 16, and 18, respectively. Processors 12, 14, 16, and 18 may all assert their respective bus request lines at time 162 as shown at 164, 166, 168, and 170, respectively. A snap-shot is taken in this example at time 162. Since all of the processors have asserted their respective bus request signals, each of the processors will be serviced in the order of their assigned priority. FIG. 3B assumes that processor 12 has a priority of 1, processor 14 has a priority of 2, processor 16 has a priority of 3, and processor 18 has a priority of 4. Therefore, processor 12 is granted priority and control of bi-directional bus 20 at time 162. Busy 158 is then asserted by processor 12 as shown at 172. Bi-bus 160 then transmits data provided by processor 12 at time 162 as shown at 174. At time 180, processor 12 releases bi-directional bus 20. The first-in-place priority scheme then service the next highest priority processor that was captured during the previous snap-shot. In this case, processor 14 has the next highest priority assigned. Therefore, at time 182, control of bi-directional bus 20 is granted to processor 14. Busy 158 is then asserted by processor 14 at time 182 as shown at 188. Bi-bus 160 then transmits data provided by processor 214 at time 182 as shown at 190. Processor 14 releases bi-directional bus 20 at time 192. The first-in-place priority scheme then grants control of bi-directional bus to the processor having the next highest priority value. In this case, processor 16 has the next highest priority assigned. Therefore, at time 198, control is granted to processor 16. Busy 158 is then asserted by processor 16 at time 198 as shown at 200. Bi-bus 160 then transmits data provided by processor 16 at time 198 as shown at 202.

Unlike in FIG. 2B, the snap-shot technique grants control to processor 16 at time 198, rather than processor 12. Since processor 12 has been serviced at time 162, it will not again be serviced until after the next snap-shot is taken.

FIG. 4A is a schematic diagram of a number of users coupled to a shared resource. FIG. 4A is a duplicate of FIG. 1A and is duplicated herein for the reader's convenience. FIG. 4B is a chart illustrating a rotating priority scheme. The rotating priority scheme is generally shown at 210. Various time intervals are shown at 212, 214, 216, 218, 220, 222, and 224 in ascending order. At time T1 212, processor 12 is assigned a priority value of "1", processor 14 is assigned a priority value of "2", processor 16 is assigned a priority value of "3", and processor 18 is assigned a priority value of "4". At time T2 214, the priority value assigned to each processor is shifted in a round-robin fashion as shown. That is, processor 14 is now assigned a priority value of "1" as shown at 236. Similarly, at time T3 216, processor 16 is assigned a priority value of "1" as shown at 238. Finally, at time T4 218, processor 18 is assigned a priority value of "1" as shown at 240. This process is continued during normal functional operation. Therefore, each user is assigned a new priority value in a round-robin fashion on a periodic basis. Each user is then allowed to access the shared resource on a periodic basis.

FIG. 5 is a schematic diagram of a number of users coupled to a shared resource wherein the first-in-place priority values can be assigned to the users via an external and independent controller. Processors 252, 254, 256 and 258 each have a bi-directional data port which is coupled to a bi-directional bus 260. Processors 252, 254, 256, and 258 also have a bus request signal which is coupled to a busy bus 262. This arrangement is similar to the configuration shown and described in FIGS. 1A, 2A, 3A, and 4A. However, in this configuration, a controller 264 is coupled to processors 252, 254, 256, and 258 via interfaces 266, 268, 270, and 272, respectively. Controller 264 may independently change the priority values of processors 252, 254, 256, and 258. That is, controller 264 has the ability to change the priority value assigned to each user whenever the controller 264 independently determines that it is necessary.

Although this configuration provides some additional flexibility to the first-in-place scheme, significant disadvantages still remain. First, the priority values of the users can only be changed at the direction of controller 264 which is not otherwise coupled to the users. Therefore, the separate processor must independently determine when a priority change should occur without regard to the current status of the users. Second, the controller 264 can only load new priority values into the users at predetermined intervals. Between these intervals, the operation of the apparatus shown in FIG. 5 is the same as the first-in-place scheme described above.

Figure 6:
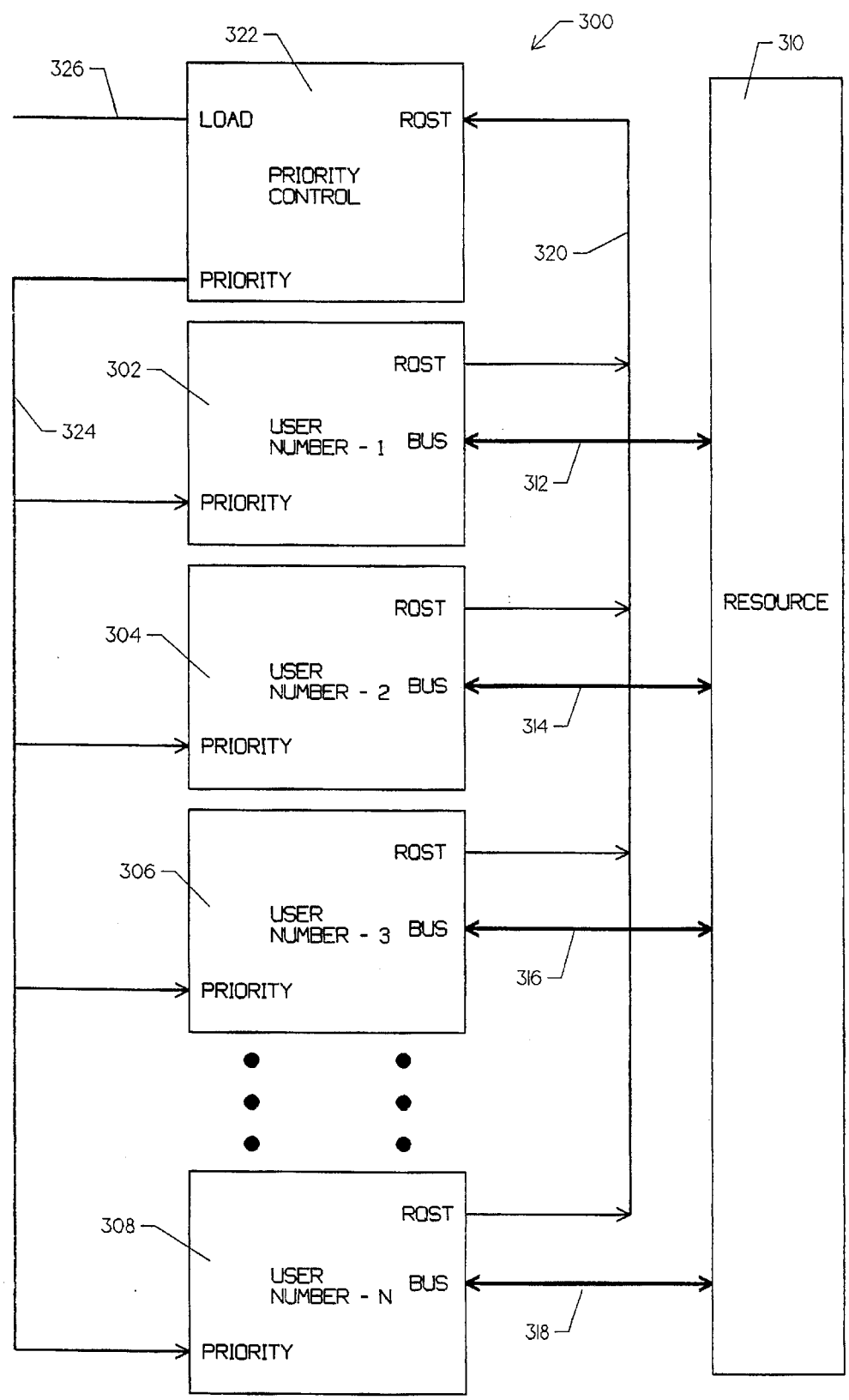
FIG. 6 is a schematic diagram illustrating a first exemplary embodiment of the present invention.

FIG. 6 is a schematic diagram illustrating a first exemplary embodiment of the present invention and is shown generally at 300. The embodiment shown in FIG. 6 generally comprises a plurality of users that are coupled to a shared resource. Users 302, 304, 306, and 308 may each have a bi-directional bus for exporting and importing data, a request port for requesting access to resource 310, and a priority input port which, when enabled, grants the user access to the shared resource 310. Users 302, 304, 306, and 308 may comprise a processor, a memory device, a computer system, a modem, or any other user means. It is further contemplated that interfaces 312, 314, 316, and 318 may comprise a bus, a phone line, a fiber optic medium, an infrared or RF medium, or any other communication means. Shared resource 310 may comprise a memory device, a processor, a tape drive, a computer system, a bus, or any other type of shared resource.

Figure 7:
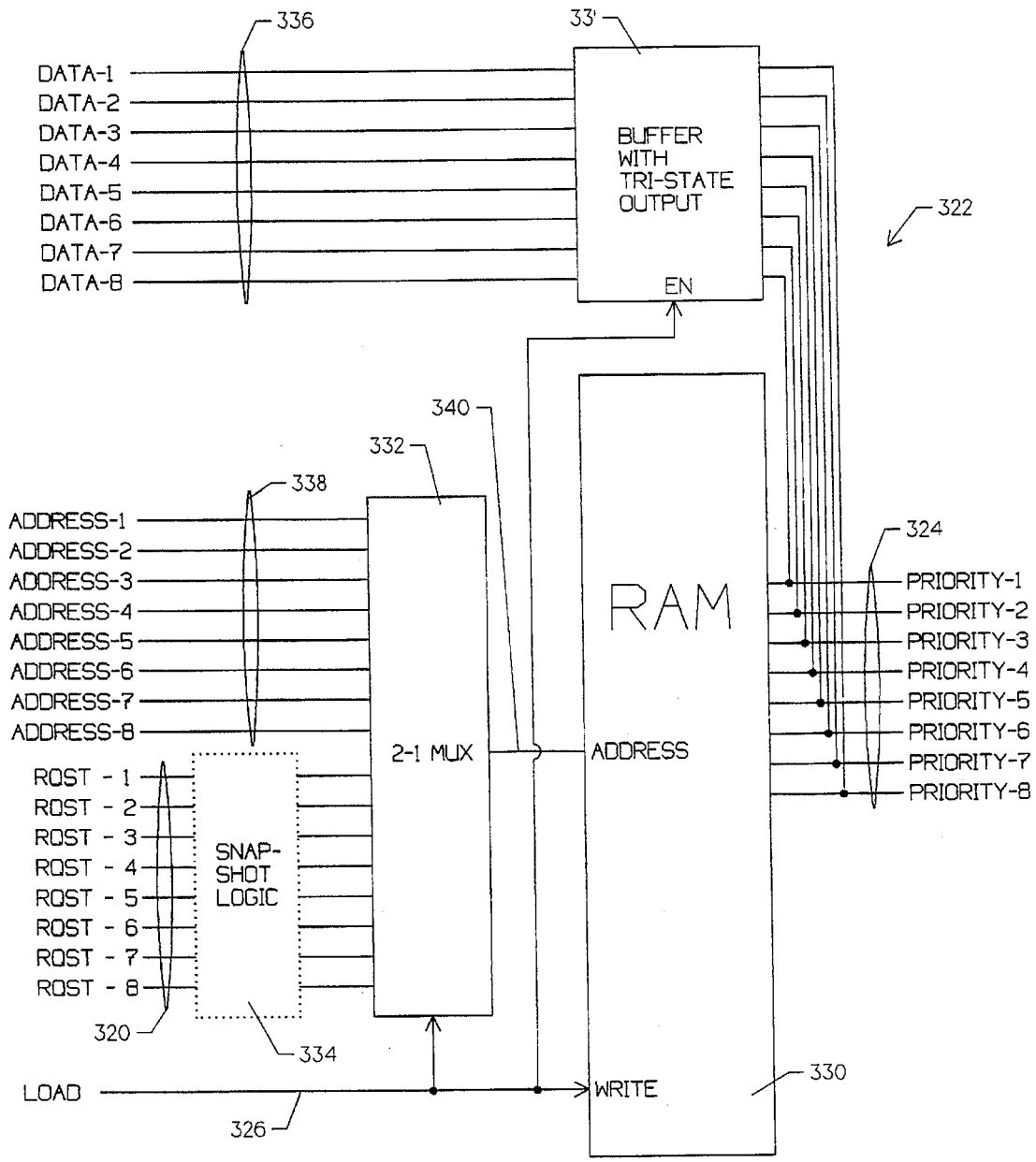
FIG. 7 is a schematic diagram illustrates an exemplary implementation of the priority controller of the first embodiment of the present invention.

In the exemplary embodiment of FIG. 6, the bi-directional bus port of user 302 is coupled to shared resource 310 via interface 312. The bi-directional bus port of user 304 is coupled to shared resource 310 via interface 314. The bi-directional bus port of user 306 is coupled to shared resource 310 via interface 316. Finally, the bi-directional bus port of user 308 is coupled to shared resource 310 via interface 318. It is contemplated that any number of users may be coupled to shared resource 310. The request ports of users 302, 304, 306, and 308 may be coupled to a priority control 322 via interface 320. One exemplary embodiment of priority control 322 is shown in FIG. 7 and will be discussed infra. The priority ports of users 302, 304, 306, and 308 are coupled to priority control 322 via interface 324.

Priority control 322 receives the request signals from all of the users coupled to a particular shared resource. Priority control 322 then assigns priority to the plurality of users based upon the combination of the request signals. For each combination of request signals provided by users 302, 304, 306, and 308, a different priority may be assigned to each user by priority control 322. It is contemplated that each user may provide one or more request bits. Exemplary request formats are shown and discussed in FIG. 8C.

FIG. 7 is a schematic diagram illustrating an exemplary implementation of priority control 322 of the embodiment shown in FIG. 6. Priority control 322 may be implemented by concatenating the request signals 320 provided by the users, and feeding the result into an address input of a memory device 330. For each combination of request signals 320, a unique address location within the memory device may be accessed. The contents of the memory device may be programmed such that each combination (or address) of request signals 320 results in a different priority assignment as shown at 324. The data input/outputs of the memory device 330 may then be coupled to a priority input on the corresponding users. Priority may then be granted to the user having an asserted priority input provided by the memory device 330.

In the embodiment shown in FIG. 7, the address input of memory device 330 is coupled to the output of a 2-1 MUX 332. A select input of 2-1 MUX 332 is coupled to the write input of memory device 330 and further coupled to a load input via interface 326. A first data input of 2-1 MUX 332 may be coupled to a plurality of address lines 338. A second data input of 2-1 MUX 332 may be coupled to a bus comprising the concatenation of the request signals provided by the users as shown at 320.

Data lines 336 may be coupled to a buffer 331. The outputs of buffer 331 may be coupled to the data input/ output port of memory 330. Buffer 331 may have tri-statable outputs such that buffer 331 may communicate with the bi-directional data port of memory 330. The tri-state outputs of Buffer 331 are enabled via the load signal on interface 326.

The input/output port of memory device 330 may form a priority bus as shown at 324. The concatenation of request signals shown at 320, the priority bus shown at 324, and the load signal shown at 326 represent the corresponding interfaces with like reference numerals as shown in FIG. 6.

During normal operation, load 326 is set low such that memory device 330 is in a read mode and 2-1 MUX 332 selects the concatenation of request signals at 320. Further, buffer 331 is disabled. In this mode, the concatenated request signals shown at 320 are fed through 2-1 MUX 332 and into the address input of memory device 330. The contents of memory device 330 may be programmed such that each combination (or address) of the concatenated request signal shown at 320 results in a different priority assignment. The data input/output port of memory device 330 may then be coupled to the priority inputs of the plurality of users.

Periodically, it may be desirable to reprogram memory device 330. This may be accomplished by asserting load 326 such that memory device 330 is placed into a write mode, 2-1 MUX 332 selects address lines 338, and buffer 331 is enabled allowing data lines 336 to be coupled to the data input/output port of memory 330. Load 326, address bus 338, and data lines 336 may all be controlled by a separate processor. Each address presented on address bus 338 may be written with a value imposed on data bus 336. It is contemplated that either all addresses in memory device 330, or a portion thereof, may be periodically written with new data.

Because memory 330 has a bi-directional data port, the processors that are coupled to the priority signals shown at 324 may receive the signals provided by buffer 331 during the load operation. It is contemplated that each of the processor that receive the signals provided by buffer 331 also receive the load signal or equivalent. The load signal or equivalent thereby indicates to the processors that the priority signals received during the corresponding load instruction should be ignored.

Snap shot logic 334 may be incorporated into the exemplary embodiment if desired. Snap shot logic 334 may be used to capture the status of the concatenated request signals shown at 320 at a predetermined time. One advantage of having snap shot logic 334 is to stabilize the address inputs of memory device 330, thereby stabilizing the priority signals shown at 324. Only at predetermined time intervals may snap shot 334 allow the address input of memory device 330 to change.

This is only an exemplary embodiment of the present invention and it is recognized that other implementations exist. For example, it is recognized that memory device 330 may comprise combinational logic, a PLA, a ROM, a RAM, a register file, or any other means which allow the priority assigned to a particular user to be determined by the combination of request signals. It is recognized that if memory device 330 is an ROM, it is not necessary to have load 326, 2-1 MUX 332, address bus 338, or data bus 336. That is, the concatenated request signals shown at 320 may be fed directly into the address port of the ROM device. Similar changes in implementation may be required when memory device 330 comprises combinational logic, a PLA, a register file, or other means.

FIG. 8A is a schematic diagram of a priority controller generally shown at 348. A priority controller 350 may have bus request signals 352, 354, and 356 as inputs. Similarly, priority controller 350 may have priority signals 358, 360, and 362 as outputs. Bus request 352 may be provided by a first user, bus request 354 may be provided by a second user, and bus request 356 may be provided by a third user. Similarly, priority signal 358 may be provided to the first user, priority signal 360 may be provided to the second user, and priority signal 362 may be provided to the third user. For each combination of bus request signals 352, 354, and 356, priority controller 350 may assign a different priority value to priority signals 358, 360, and 362.

FIG. 8B is a chart generally shown at 382 illustrating a fundamental difference between the present invention and the prior art priority schemes. Columns 364, 366, and 368 show all possible combinations of bus request signals 352, 354, and 356. Column 370 shows which processor is granted priority based on the combination of request signals for a prior art system. For clarity, it is assumed that the prior art priority scheme is a first-in-place scheme. Further, it is assumed that the first user has priority over the second user which has priority over the third user. For example, the first user has priority at rows 374, 376, 378, and 380 because RQST-1 shown in column 364 is set high. In the present invention, a different user may be given priority for each combination of request signals, even while RQST-1 is set high. Referring to column 372, it is clear that the present invention is inherently different than the prior art schemes. That is, the priority assigned to a particular user in the present invention is determined by a particular combination of the bus request signals, and not simply by having a fixed priority sequence as in the first-in-place scheme. Further, it is clear that the present invention allows greater flexibility in determining the priority of a particular user than the prior art schemes. For example, different users may be given priority based solely on the combination of bus request signals as can be seen in rows 374, 376, 378, and 380.

FIG. 8C is a chart illustrating three exemplary data formats for the resource request signal in accordance with the present invention. The exemplary request formats are shown generally at 390. A first exemplary request format is shown at 392 and may comprise a single resource request bit. The resource request bit may be asserted by a user when the user desires access to the shared resource. This is the simplest exemplary request format and may require the least amount of supporting circuitry.

Each user may provide a single bit request. The resulting single bit request bits may be concatenated together and coupled to an address input of a memory device as shown in FIG. 7. The format shown at 392 may require the least number of address locations within a memory device over the formats shown at 394 and 396.

A second exemplary request format is shown at 394 and may comprise a first bit indicating whether the user is ready to input data, and a second bit indicating when the user is ready to output data. Each user then provides two request bits to a priority controller. Further discussion of this format will be deferred until the discussion of FIGS. 9-12.

Another exemplary request format is shown at 396 and may comprise a request bit 400 similar to the format shown at 392, along with additional information bits 398. The request bit 400 may be set to indicate that the particular user desires access to the shared resource. The additional information bits 398 may provide additional information including, but not limited to, the urgency of the particular request. That is, additional information bits 398 may be used to indicate a "requested priority" for a particular access. A priority controller then may weigh the priority requests from each user, including the additional information bits 398, and determine an optimum priority assignment. In this embodiment, the users themselves may influence the priority assigned thereto by providing the additional information bits 398 to the priority controller. An advantage of this embodiment is that when a particular user has a high priority request, it has a higher probability of gaining control of the shared resource. This, in turn, may positively influence the band pass of a given computer system.

An embodiment having the exemplary request format shown at 396 may be implemented in a similar way to the embodiment shown in FIG. 7. However, in the present embodiment, each resource request signal may comprise a number of bits, rather than just a single resource request bit. Encoded in the additional bits may be a priority request as described above. The priority request may indicate the urgency of a particular request by a particular user. That is, if a user has an urgent need to use the shared resource, the user may indicate that urgency in the additional bits. The resource request signals from the plurality of users, including the information bits, may be concatenated together to form an address for a memory device. For each combination of the resource request signals, a unique address location within the memory device may be accessed. The contents of the memory device may be programmed such that each combination (or address) of resource request signals, including information bits, results in a different priority assignment. The data outputs of the memory device may then be coupled to a priority input on the corresponding users. Priority may then be granted to the user having an asserted priority input provided by the memory device.

As with the previously described embodiments, it is recognized that numerous other ways of implementing the present embodiment may exist including the use of combinational logic, PLA's, ROM's, RAM's, register files, or any other means.

Figure 9:
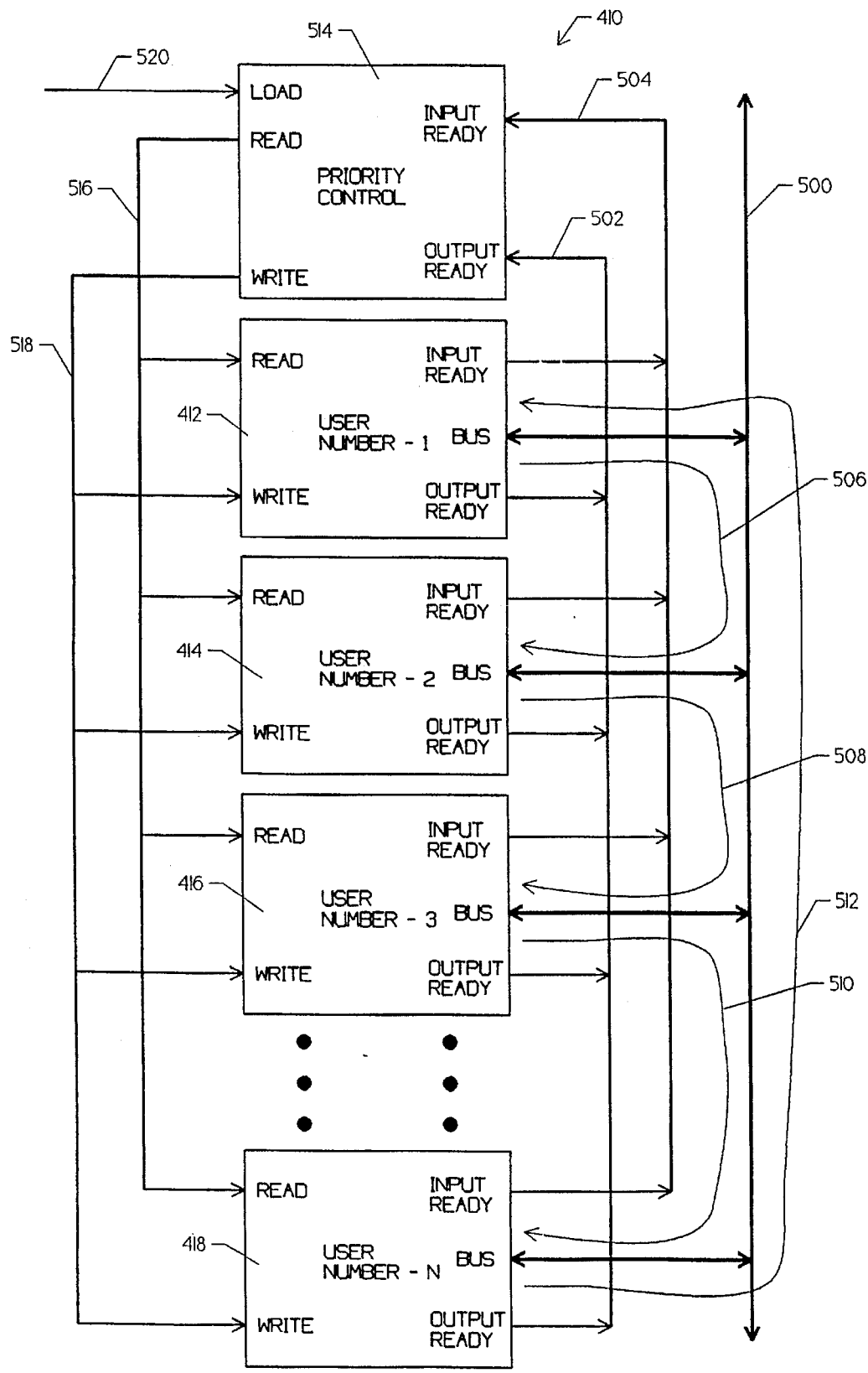
FIG. 9 is a schematic diagram illustrating another exemplary embodiment of the present invention.

FIG. 9 is a schematic diagram illustrating another exemplary embodiment of the present invention. In this embodiment, two resource request signals are provided by each user as illustrated in FIG. 8C at 394. First, an input ready signal is provided which indicates that a particular user is ready to accept input data. Second, an output ready signal is provided which indicates that a particular user is ready to provide output data. The input ready signal and output ready signal provided by the users may be concatenated together to form a resource request bus. The resource request bus may then be coupled to an address input of a memory device. For each combination of the resource request bus, a unique address location within the memory device may be accessed. The contents of the memory device may be programmed such that each combination (or address) of the resource request bus may result in a different priority assignment to the users. The priority assignment provided by the data outputs of the memory device may then be coupled to a "read input" and a "write input" on the corresponding users. Write priority may then be granted to the user having an asserted "write" input, and read priority may be granted to the user having an asserted "read" input.

In a preferred embodiment, the memory device may be programmed to only allow valid data transfer paths. That is, the memory device may be programmed to only allow specific data paths between certain users. This may be accomplished by programming the memory device such that the read input of a first user and a write input of a second user are never simultaneously asserted if the data path from the second user to the first user is determined to be invalid.

This may be advantageous because a user may not have to transmit a receiving user's address to the shared resource before transmitting data thereto. In a typical system, a sending user must transmit a receiving user's address to indicate which of the users is to receive the data. Therefore, the exemplary embodiment may reduce the time necessary to transmit data from one user to another.

Referring to FIG. 9, each user has an input ready signal and an output ready signal. Further, each user has a read input signal and a write input signal. Each user may assert the input read signal when the user is ready to read data. The user may assert the output ready signal when the user is ready to write data. The data is read or written through a bi-directional bus output port in the exemplary embodiment. The input ready signal of users 412, 414, 416, and 418 are coupled to a priority control 514 via interface 504. Similarly, the output ready signal of users 412, 414, 416, and 418 are coupled to priority control 514 via interface 502. The bi-directional bus port of users 412, 414, 416, and 418 are coupled to a shared bus 500. The read input ports of users 412, 414, 416, and 418 are coupled to priority control 514 via interface 516. Finally, the write input port of users 412, 414, 416, and 418 are coupled to priority control 514 via interface 518.

In the exemplary embodiment, only predetermined paths between the user elements are allowed. For example, user 412 may write data onto bus 500 while user 414 reads the corresponding data from bus 500. This data path is shown at 506. Similarly, user 414 may write data onto bus 500 while user 416 reads the corresponding data from bus 500. This data path is shown at 508. User 416 may write data onto bus 500 while user 418 reads the corresponding data from bus 500. This path is shown at 510. Finally, user 418 may write data onto bus 500 while user 412 reads the corresponding data from bus 500. This data path is shown at 512. Priority control 514 may be programmed such that only these valid data paths are allowed. That is, when user 412 is writing data, user 414 is the only user which may be reading the corresponding data.

It is contemplated that users 412, 414, 416, and 418 may comprise a processor, a memory device, a modem, a computer system, a tape drive, or any other computer component. It is further contemplated that bus 500 may comprise a processor, a memory device, a tape drive, a computer system, a bus, or any other computer component that may be shared between a plurality of users.

Figure 10:
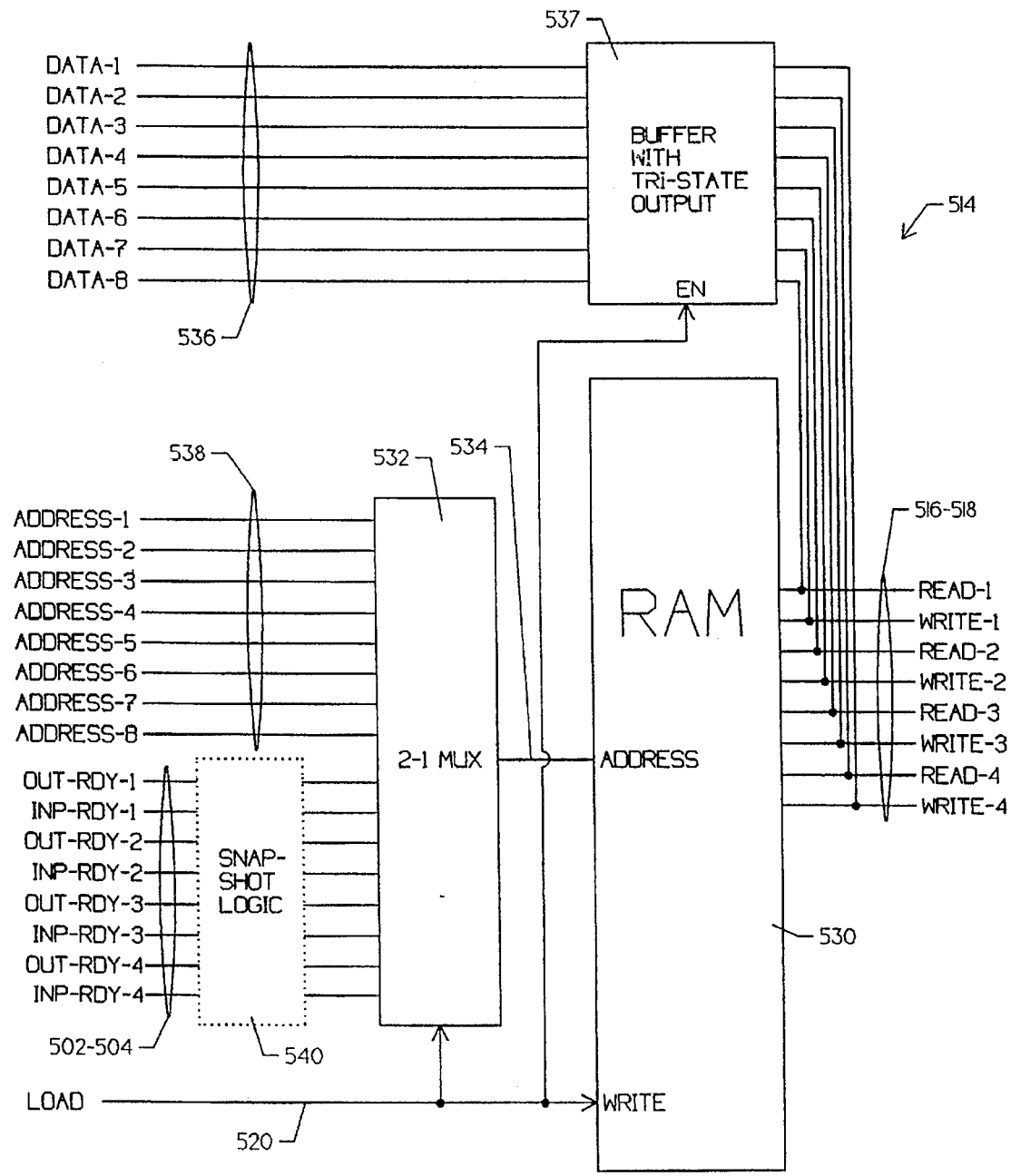
FIG. 10 is a schematic diagram illustrating an exemplary implementation of the priority controller of the embodiment shown in FIG. 9.

FIG. 10 is a schematic diagram illustrating an exemplary implementation of the priority controller of the embodiment shown in FIG. 9. The exemplary implementation of priority control 514 is nearly identical to that shown and described in FIG. 7 and is general shown at 514. A primary difference is that the input ready and output ready signals from each user are concatenated together to form an input/output ready bus which is then provided to an address input for a memory device as shown at 502–504. The output of memory device 530 comprises a read and a write enable signal for each user of the shared resource as shown at 516–518, forming a read/write output bus. The read/write output bus shown at 516–518 corresponds to interface 516 and interface 518 of FIG. 9. Similarly, the input/output ready bus shown at 502–504 corresponds to interfaces 502 and 504 of FIG. 9.

The address port of memory device 530 is coupled to a 2-1 MUX 532 via interface 534. A write input port of memory device 530 is coupled to load 520. A select input port of 2-1 MUX 532 is also coupled to load 520. A first data input of 2-1 MUX 532 is coupled to input/output ready bus 502–504. A second data input of 2-1 MUX 532 is coupled to an address bus 538.

Data lines 536 may be coupled to a buffer 537. The outputs of buffer 537 may be coupled to the data input/output port of memory 530. Buffer 537 may have tri-statable outputs such that buffer 537 may communicate with the bi-directional data port of memory 530. The tri-state outputs of Buffer 537 are enabled via the load signal on interface 520.

During normal operation, load 520 is asserted low, thereby placing memory device 530 in a read mode. Further, 2-1 MUX 532 is forced to select the input/output ready bus 502–504. That is, the concatenation of input ready and output ready signals from the plurality of users passes through 2-1 MUX 532 and is coupled to the address input port of memory device 530 via interface 534.

In a preferred embodiment, the memory device is programmed to only allow valid data transfer paths. That is, the memory device may be programmed to only allow specific data paths between certain users as shown in FIG. 9. This may be accomplished by programming the memory device such that the read input of a first user and a write input of a third user are never simultaneously asserted at 516–518 if the data path from the third user to the first user is determined to be invalid. This may be advantageous because a user may not have to transmit a receiving user's address to the shared resource before transmitting data thereto. In a typical system, a sending user must transmit a receiving user's address to indicate which of the users is to receive the data. Therefore, the exemplary embodiment may reduce the time necessary to transmit data from one user to another.

Periodically, it may be desirable to reprogram memory device 530. This may be accomplished by asserting load 520 such that memory device 530 is placed into a write mode, 2-1 MUX 532 selects address lines 538, and buffer 537 is enabled allowing data lines 536 to be coupled to the data input/output port of memory 530. Load 520, address bus 538, and data lines 536 may all be controlled by a separate processor. Each address presented on address bus 538 may be written with a value imposed on data bus 536. It is contemplated that either all addresses in memory device 530, or a portion thereof, may be periodically written with new data.

Because memory 530 has a bi-directional data port, the processors that are coupled to the read/write signals shown at 516–518 may receive the signals provided by buffer 537 during the load operation. It is contemplated that each of the processor that receive the signals provided by buffer 537 also receive the load signal or equivalent. The load signal or equivalent thereby indicates to the processors that the read/write signals received during the corresponding load instruction should be ignored.

As previously discussed in FIG. 7, snap shot logic 540 may be incorporated into the present embodiment. Snap shot logic 540 may stabilize the address lines of memory device 530. It is contemplated that the present invention may be implemented in a variety of ways including combinational logic, PLA's, ROM's, register file, or any other means. For example, memory device 530 may comprise a ROM. If memory device 530 comprises a ROM, it is not necessary to have data bus 536, address bus 538, 2-1 MUX 532, or load 520. The input/output ready bus 502–504 may be, in that case, coupled directly to the address input of the ROM.

Figures 11A, 11B:
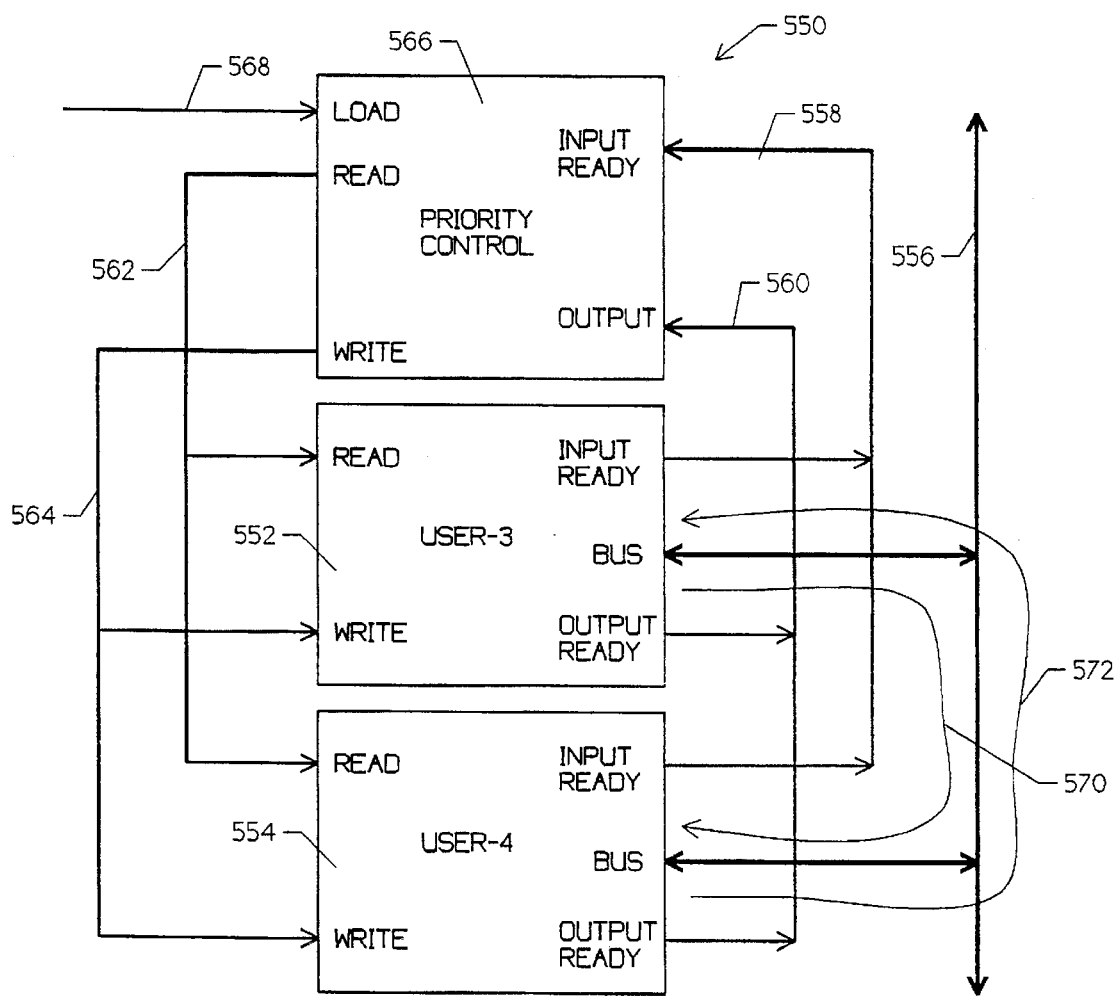
FIG. 11A is a schematic diagram of a number of users coupled to a shared resource in accordance with the present invention.
FIG. 11B is a diagram showing an exemplary algorithm for transferring data between users.

FIG. 11A is a schematic diagram of a number users coupled to a shared resource in accordance with the present invention. The embodiment comprises two users and one priority control circuit. The implementation is similar to that shown in FIGS. 9-10. A USER-3 552 and a USER-4 554 each have an input ready port and an output ready port which are coupled to a priority control 566 via interfaces 558 and 560, respectively. Further, USER-3 552 and USER-4 554 each have a read input port and a write input port which are coupled to priority control 566 via interfaces 562 and 564, respectively. Finally, USER-3 552 and USER-4 554 each have a bi-directional bus port which are coupled to bus 556. As in FIG. 9, only certain paths between USER-3 552 and USER-4 554 are valid. That is, USER-3 552 may transmit data across bus 556 and to USER-4 554 via data path 570. Similarly, USER-4 554 may transmit data across bus 556 and to USER-3 552 via data path 572.

FIG. 11B is a diagram showing an exemplary algorithm generally shown at 590 for transferring data between users. This algorithm may be implemented by programming priority control 566. FIG. 11C is a diagram showing the first "if" statement at 592 and the second "else if" statement at 600 of algorithm 590 as programmed into a memory within priority control 566. Although FIG. 11A does not show a USER-1 or a USER-2, the memory program shown at 592 assumes they exist. However, since the algorithm shown at 590 does not require either USER-1 or USER-2 to communicate with USER-3 or USER-4, they have been omitted for clarity.

Referring back to FIG. 10, USER-4 554 has the output ready signal coupled to address bit "6" of memory device 530. Similarly, the input ready signal of USER-4 554 is coupled to bit "7" of the address port of memory device 530. The output ready signal of USER-3 552 is coupled to address bit "4" of memory device 530. Finally, the input ready signal of USER-3 552 is coupled to address bit "5" of memory device 530.

The read input signal of USER-4 554 is coupled to data bit "7" of memory device 530. The write input signal of USER-4 554 is coupled to data bit "6" of memory device 530. Similarly, the write input signal of USER-3 552 is coupled to data bit "5" of memory device 530. Finally, the read input signal of USER-3 552 is coupled to data bit "4" of memory device 530.

To represent the first line of the first "if" statement of algorithm 590, address bits "5" and "6" must both be set high. In addition, to implement the second line of the first "if" statement of algorithm 590, data bits "5" and "7" must both be high. In a similar manner, to implement the first line of the second "else if" statement of algorithm 590, address bits "4" and "7" must be set high. Finally, to implement the second line of the second "else if" statement of algorithm 590, data bits "4" and "6" must be set high.

Therefore, binary addresses of the form X11XXXXX should be set to 10100000 where "X" equals a don't care condition. Address of the form 1XX1XXXX should be set to 01010000. Therefore, a truth table implementation of the first "if" statement of algorithm 590 is shown at 592 in FIG. 11C. Similarly, a truth table implementation of the second "else if" statement of algorithm 590 is shown at 600 of FIG. 11C. A final table shown at 610 in FIG. 11D is a merger of table 592 and table 600. Table 592 and table 600 are merged in such a way that any non-zero data stored at any address that happens to appear in both tables is set to what table 592 indicates. For example, address 11111111 appears in both tables so that the data is set to 01010000 since this is what is in table 592. The procedure used for merging the two tables is a result of the way the "if" statements are ordered in algorithm 590. In this case, the ordering of the "if" statements was arbitrary and the same data flow may be constructed by reversing the order of the "if" statements, thus resulting in a different, but equivalent final table.

Figure 12A:
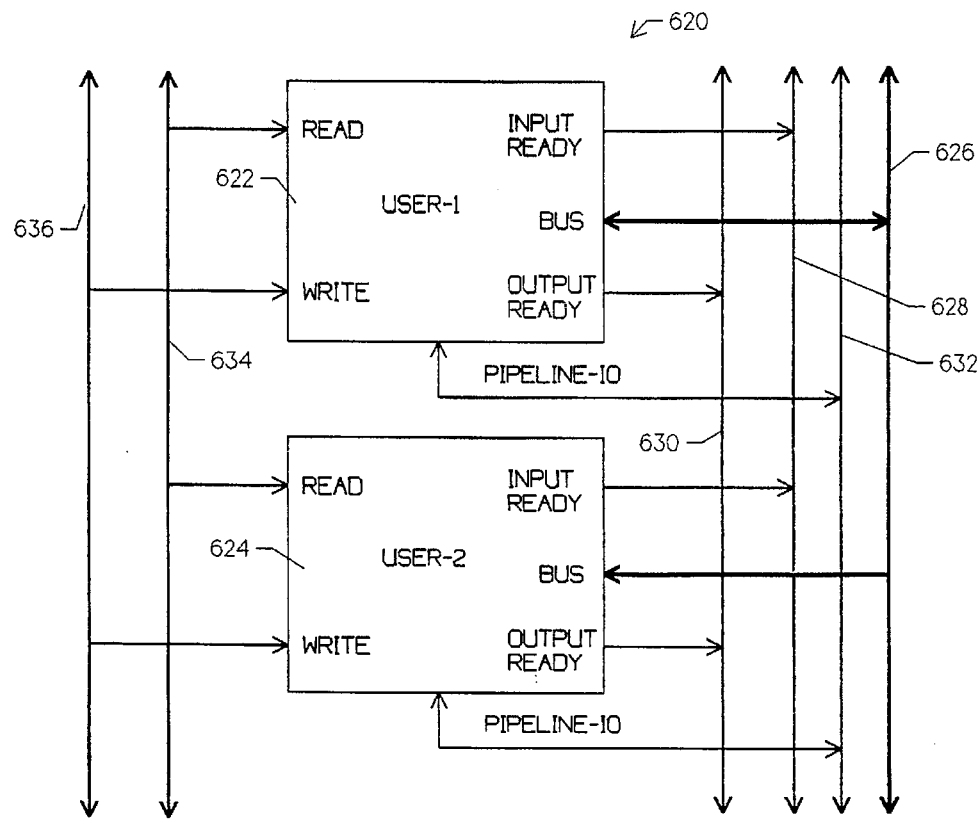
FIG. 12A is a schematic diagram of a preferred embodiment of the present invention.
Figure 12B:
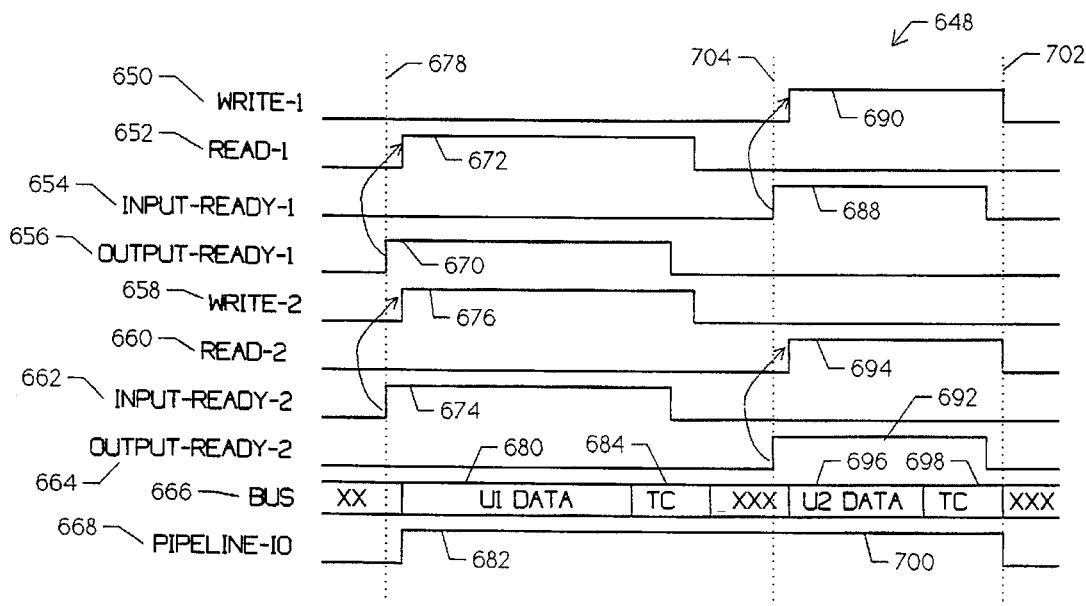
FIG. 12B is a timing diagram illustrating the relative signal timing of the embodiment shown in FIG. 12A.

FIG. 12A is a schematic diagram of a preferred embodiment of the present invention. FIG. 12B is a timing diagram illustrating the relative signal timing of the embodiment shown in FIG. 12A. The present embodiment is generally shown at 620. It is similar to the embodiment shown in FIG. 9, with the exception of a pipeline-IO signal shown at 632. FIG. 12B is a timing diagram to illustrate the operation of a preferred mode of the present invention. Read-1 650 corresponds to the read input port of USER-1 622. Write-1 652 corresponds to the write input port of USER-1 622. Input-ready-1 654 corresponds to the input ready port of USER-1 622. Output-ready-1 656 corresponds to the output ready port of USER-1 622. Read-2 658 corresponds to the read input port of USER-2 624. Write-2 660 corresponds to the write input port of USER-2 624. Input-ready-2 662 corresponds to the input ready port of USER-2 624. Output-ready-2 664 corresponds to the output ready port of USER-2 624. Bus 666 corresponds to a shared bus resource 626. Finally, pipeline-IO 668 corresponds a pipeline-IO signal 632.

At time 678, output-ready-1 656 is asserted indicating that USER-1 622 is ready to transmit data over shared resource bus 626. Also at time 678, input-ready-2 662 is asserted, thereby indicating that USER-2 624 is ready to accept data from shared bus 626. Output-ready-1 656 and input-ready-2 662 are coupled to a priority controller, which provides an assertion on read-1 652 as shown at 672, and write-2 658 as shown at 676. It is assumed that the data path from USER-1 622 to USER-2 624 is a valid data path. When the priority controller asserts read-1 652 and write-2 658, USER-1 622 begins transmitting data onto shared bus 626 as shown at 680. Also, USER-2 624 begins receiving the data provided by USER-1 622.

Whenever a user is writing data on shared bus 626, a "terminal count" signal may be asserted while the last data element is being written. In a preferred mode, after a user has transmitted a terminal count, that user must not indicate an output ready signal on the next bus cycle. Similarly, whenever a user is receiving from shared bus 626, that user must sample the state of "terminal count" to determine if the current data is the last data in the data stream. After receiving a write signal and detecting a terminal count signal, the user may not indicate that it is ready to receive data during the next bus cycle or any subsequent bus cycle until pipeline-IO 668 is de-asserted to reset the processors.

Pipeline-IO 668 indicates that shared bus 626 is being used to synchronously transfer data between users. When pipeline-IO 668 is false, shared bus 626 is no longer being used and the users should reset themselves into a state in which they will be ready to accept more data once pipeline-IO 668 is once again asserted. Therefore, pipeline-IO 668 is asserted when USER-1 622 begins transmitting data.

At time 704, input-ready-1 654 is asserted as shown at 688. Similarly, at time 701, output-ready-2 656 is asserted as shown at 692. A priority controller then may set write-1 650 as shown at 690 indicating that USER-1 622 may begin receiving data from shared bus 626. Similarly, the priority controller may assert read-2 660 as shown at 694 indicating that USER-2 624 may begin transmitting data onto shared bus 626. USER-2 624 begins transmitting data onto shared bus 626 as shown at 696.

Pipeline-IO 668 is re-asserted when USER-2 624 begins transmitting data. When asserted, pipeline-IO 668 indicates that bus 666 is being used to synchronously transfer data between processors. When not asserted, pipeline-IO 668 indicates that bus 666 is no longer being used and the processors may reset themselves into a state in which they will be ready to accept data when pipeline-IO is once again asserted. Finally, USER-2 624 transmits a terminal count signal indicating the end of the data stream as shown at 698. At time 702, the bus is released by both users and bus 666 goes unknown.

The above discussion refers to a transfer of data from USER-1 622 to USER-2 624 and from USER-2 624 to USER-1 622 as if they are separate and independent transfers. That is, USER-1 622 may transfer a predetermined number of data blocks to USER-2 624 before USER-2 624 transfers a predetermined number of data packets to USER-1 622. However, in a preferred embodiment, these transfers may not be totally independent but rather may be interleaved. That is, USER-1 may send a packet of data to USER-2 624 so that USER-2 624 may perform a processing function thereon. Before all of the data packets are transferred by USER-1 622 to USER-2 624, USER-2 624 may begin transferring the resulting data back to USER-1 622. That is, USER-2 624 does not necessarily need to receive all of the data packets from USER-1 622 before USER-2 624 may begin transmitting processed data back to USER-1 622. Depending on the operation, USER-2 624 may be ready to transmit the processed data back to USER-1 622 once USER-2 624 receives a first data packet from USER-1 622. In a preferred mode, the operation is not complete until the resulting data is transferred back from USER-2 624 to USER-1 622.

In the preferred mode, transfers from USER-1 622 to USER-2 624 and from USER-2 624 to USER-1 622 may be performed "simultaneously". Obviously both transfers cannot occur on the same bus cycle. However, while USER-1 622 may transfer a data packet to USER-2 624 on bus cycle "N", USER-2 624 may transfer a data packet to USER-1 622 on bus cycle "N+1", and so on. The interleaving of transfers may be important because the limiting factor then becomes the performance of the processors rather than the performance of the bus or the bus controller.

Figure 13:
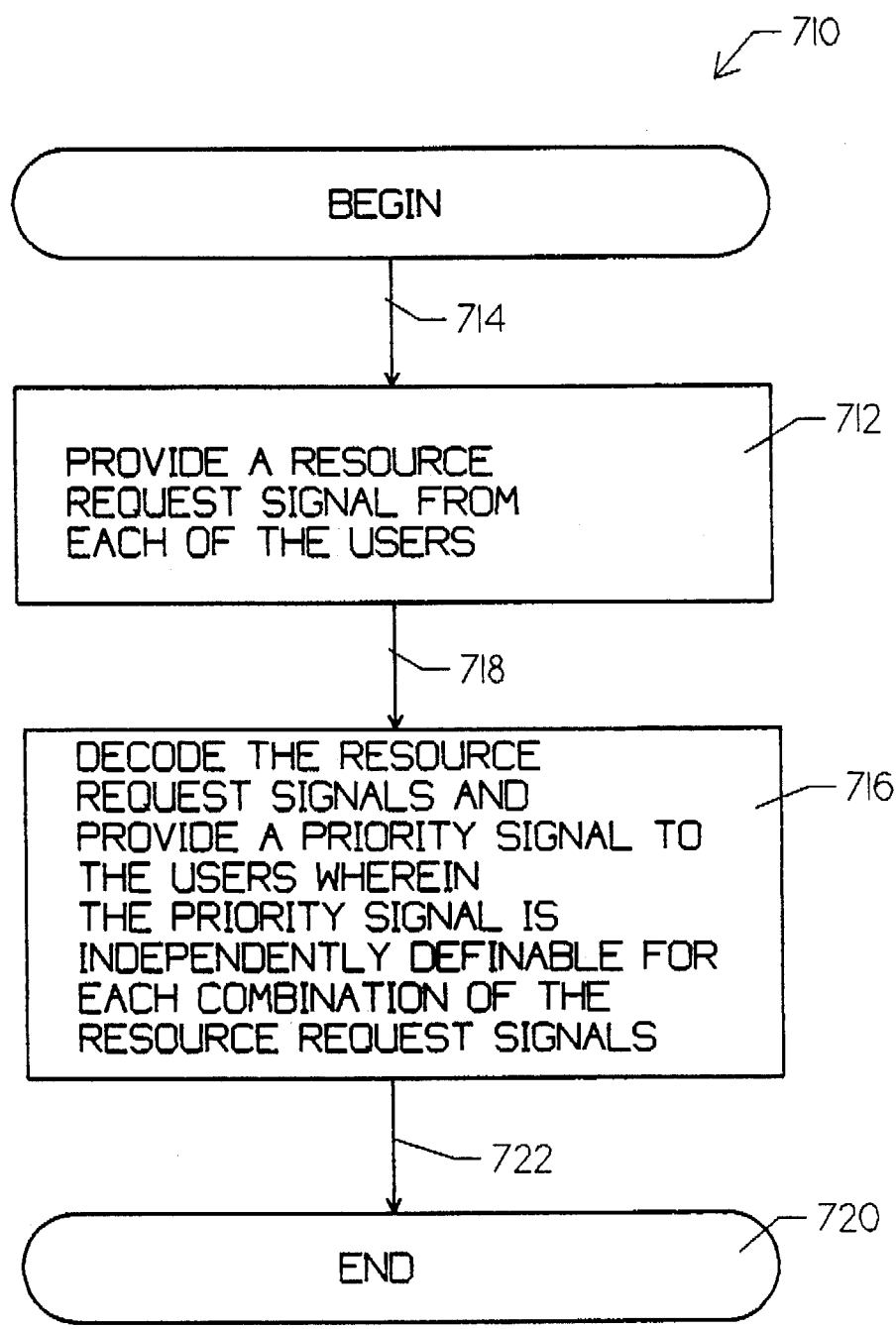
FIG. 13 is a flow diagram of an exemplary embodiment of the present invention.

FIG. 13 is a flow diagram of an exemplary embodiment of the present invention. The flow diagram is generally shown at 710. The algorithm is entered at element 711 and control is passed to element 712 via interface 714. Element 712 provides a resource request signal from each of a plurality of users. Control is then passed to element 716 via interface 718. Element 716 decodes the resource request signals provided by element 712 and provides a priority signal to each of the plurality of users wherein the priority signal is independently definable for each combination of the resource request signals. The algorithm is then exited at element 720 via interface 722.

Figure 14:
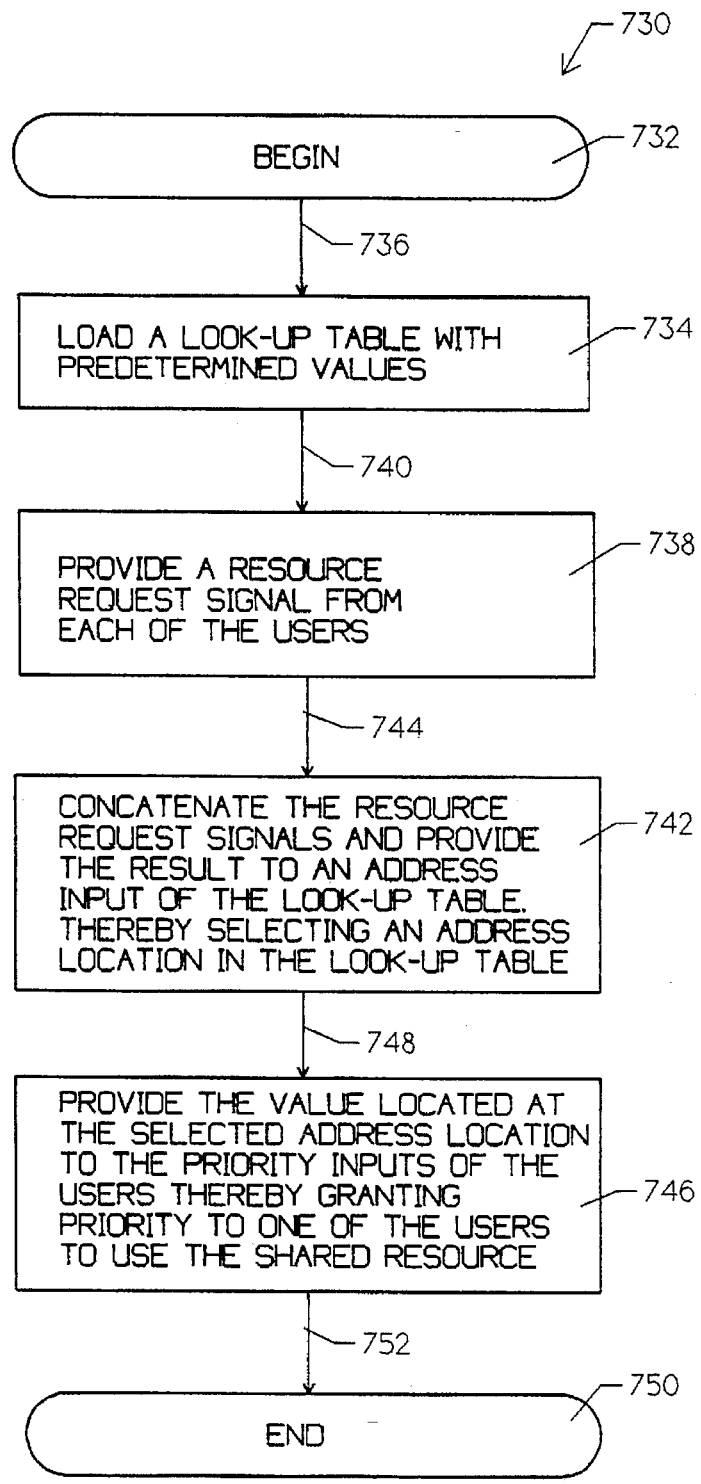
FIG. 14 is a detailed flow diagram of an exemplary embodiment of the present invention.

FIG. 14 is an detailed flow diagram of an exemplary embodiment of the present invention. The algorithm is shown generally at 730. The algorithm is entered at 732 and control is passed to element 734 via interface 736. Element 734 loads a look-up table with predetermined values. Control is then passed to element 738 via interface 740. Element 738 provides a resource request signal from each of a plurality of users. Control is then passed to element 742 via interface 744. Element 742 concatenates the resource request signals provided in element 738 and provides the result to an address input of the look-up table, thereby selecting an address location in the look-up table. Control is then passed to element 746 via interface 748. Element 746 provides the value located at the selected address location to the priority inputs of the plurality of users, thereby granting the priority to one of the users to use the shared resource. The algorithm is exited at element 750 via interface 752.

Figure 15:
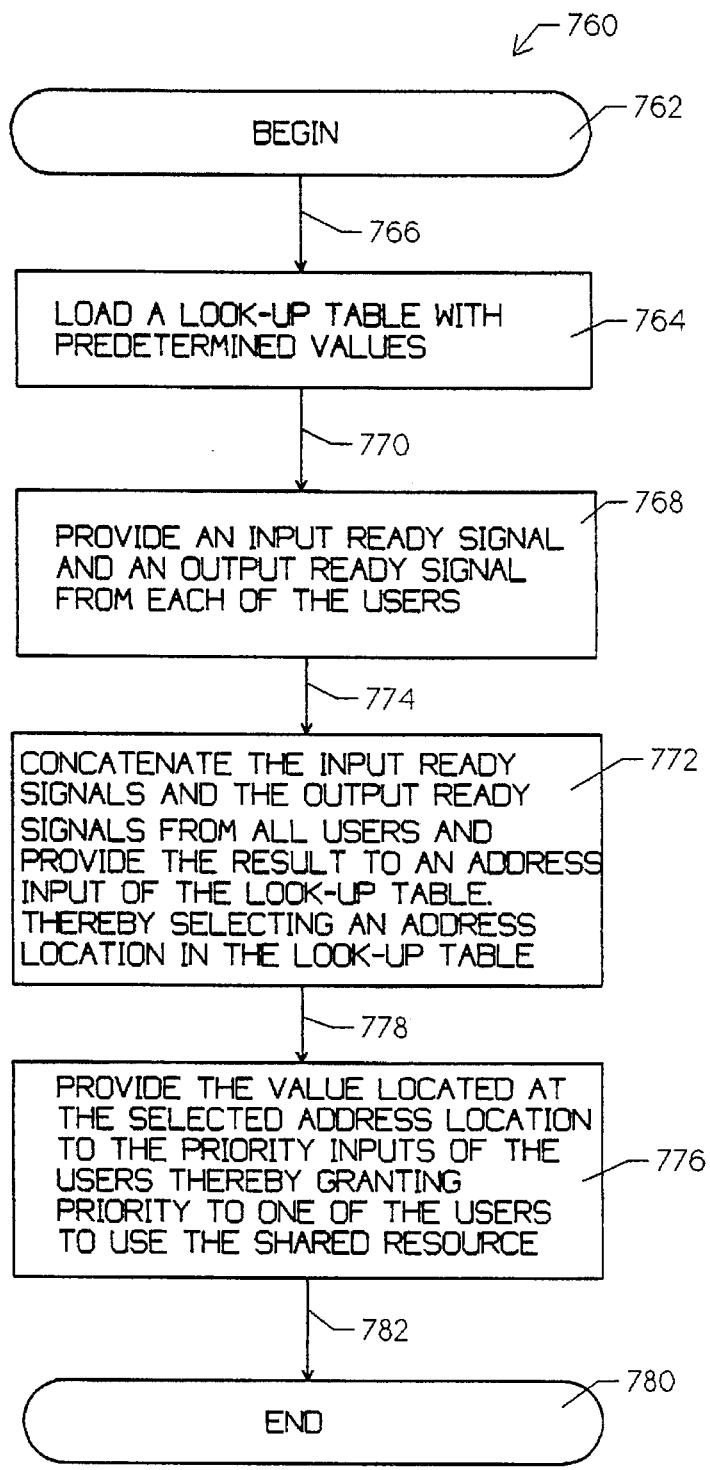
FIG. 15 is a detailed flow diagram of a preferred embodiment of the present invention.

FIG. 15 is a detailed flow diagram of a preferred embodiment of the present invention. The algorithm is shown generally at 760. The algorithm is entered at 762 and control is passed to element 764 via interface 766. Element 764 loads a look-up table with predetermined values. Control is then passed to element 768 via interface 770. Element 768 provides an input ready signal and an output ready signal from each of a plurality of users. Control is then passed to element 772 via interface 774. Element 772 concatenates the input ready signals and the output ready signals from the plurality of users and provides the result to an address input of the look-up table, thereby selecting an address location in the look-up table. Control is then passed to element 776 via interface 778. Element 776 provides the value located at the selected address location to the priority inputs of the plurality of users, thereby granting priority to one of the users to use the shared resource. The algorithm is exited at element 780 via interface 782.

Having thus described the preferred embodiments of the present invention, those of skill in the art will readily appreciate that the teachings found herein may be applied to yet other embodiments within the scope of the claims hereto attached.

I claim:

1. In a computer apparatus having a shared resource and a plurality of users wherein the plurality of users share the use of the shared resource and wherein the plurality of users each have at least one priority input line, the improvement comprising:

a. resource request means coupled to the plurality of users for asserting a plurality of resource request lines; each of the plurality of resource request lines is asserted by said resource request means when a corresponding one of the plurality of users desires access to the shared resource; and b. priority controller means coupled to the plurality of users and to said resource request means for granting priority to one of the plurality of users; said priority controller means concatenating predetermined ones of the plurality of resource request lines to form a resource request address, said priority controller means providing said resource request address to a look-up table wherein said look-up table is programmed to provide a predefined priority value to each of the priority input lines of the plurality of users, for each combination of the predetermined ones of the plurality of resource request lines, said look-up table being reprogrammable if another predefined priority value is desired, for a same said resource request address.

2. An improvement according to claim 1 wherein each of said plurality of resource request lines comprises a single resource request bit.

3. An improvement according to claim 2 wherein said look-up table has a plurality of address inputs and a plurality of data outputs; said resource request address being coupled to the plurality of address inputs; the plurality of data outputs of said look-up table being coupled to corresponding ones of the plurality of priority input lines of the plurality of users, wherein the plurality of data outputs indicate the priority of the corresponding user.

4. An improvement according to claim 3 wherein said look-up table comprises a Random Access Memory.

5. An improvement according to claim 3 wherein said look-up table comprises a Read Only Memory.

6. An improvement according to claim 3 wherein said look-up table comprises combinational logic.

7. An improvement according to claim 1 wherein said resource request means provides a plurality of resource request bits for each of the plurality of users.

8. An improvement according to claim 7 wherein said plurality of resource request bits comprise information bits.

9. An improvement according to claim 8 wherein said information bits indicate the urgency of the request.

10. An improvement according to claim 1 wherein said resource request means provides a read request bit and a write request bit for each of the plurality of users.

11. An improvement according to claim 10 wherein said priority controller means provides a read priority bit and a write priority bit to each of the plurality of users.

12. An improvement according to claim 11 wherein said priority controller means only allows predetermined data transfer paths between users.

13. An apparatus comprising:
   a. shared resource;
   b. a plurality of users coupled to said shared resource wherein said plurality of users share the shared resource; a plurality of resource request lines being provided by said plurality of users wherein each of said plurality of users provides at least one of said plurality of resource request lines; each of the plurality of users providing a plurality of information bits on corresponding ones of the plurality of resource request lines when the user desires access to said shared resource; the information bits having encoded therein the urgency of a corresponding one of the shared resource requests; and
   c. a priority controller coupled to the plurality of resource request lines for granting priority to one of said plurality of users based upon the information bits received from the plurality of users.

14. An apparatus comprising:
   a. a shared resource;
   b. a plurality of users coupled to said shared resource wherein said plurality of users share said shared resource; a plurality of resource request lines being provided by said plurality of users wherein each of said plurality of users provides at least one of the plurality of resource request lines; each of the plurality of users asserting the at least one of the plurality of resource request lines when the user desires access to said shared resource; a plurality of priority input lines being provided to said plurality of users, each of said plurality of users being provided at least one of the plurality of priority input lines; and
   c. a priority controller coupled to the plurality of resource request lines and further coupled to the plurality of priority input lines for granting priority to one of said plurality of users; said priority controller combining predetermined ones of the plurality of resource request lines to form a resource request address, said priority controller providing said resource request address to a look-up table wherein said look-up table is programmed to provide a predefined priority signal to each of the plurality of priority inputs lines, for each combination of predetermined ones of the plurality of resource request lines, said look-up table being reprogrammable if another predefined priority signal is desired, for a same said resource request address.

15. An apparatus according to claim 14 wherein each of said plurality of resource request lines comprises a single resource request bit.

16. An apparatus according to claim 15 wherein said look-up table has a plurality of address inputs and a plurality of data outputs; said resource request address being coupled to the plurality of address inputs; the plurality of data outputs of said look-up table being coupled to a corresponding one of the plurality of priority input lines, wherein the plurality of data outputs indicate the priority of a corresponding user.

17. An apparatus according to claim 16 wherein said look-up table comprises a Random Access Memory.

18. An apparatus according to claim 16 wherein said look-up table comprises a Read Only Memory.

19. An apparatus according to claim 16 wherein said look-up table comprises combinational logic.

20. An apparatus according to claim 14 wherein at least one of said plurality of users provides a plurality of resource request lines carrying a plurality of resource request bits.

21. An apparatus according to claim 20 wherein said plurality of resource request bits comprise information bits.

22. An apparatus according to claim 21 wherein said information bits indicate the urgency of the request.

23. An apparatus according to claim 14 wherein at least one of the plurality of users provides at least two resource request lines for carrying a read request bit and write request bit thereon.

24. An apparatus according to claim 23 wherein said priority controller provides a read priority bit and a write priority bit to each of the plurality of users.

25. An apparatus according to claim 24 wherein said priority controller only allows predetermined data transfer paths between users.

26. A method of granting access to a shared resource wherein the shared resource is accessed by a plurality of users, comprising the steps of:
   a. providing a plurality of resource request signals wherein each of the plurality of resource request signals is provided by one of the plurality of users; the plurality of resource request signals indicating that a corresponding one of the plurality of users desires access to the shared resource;
   b. providing a look-up table wherein the look-up table has a resource request address input and a plurality of address locations;
   c. loading each of said plurality of address locations of said look-up table with a plurality of predefined priority signals;
   d. combining predetermined ones of the plurality of resource request signals provided in step (a) to form said resource request address, and providing said resource request address to said look-up table wherein said look-up table provides a predefined priority signal to each of a plurality of priority response signals wherein each of said plurality of priority response signals is coupled to selected one(s) of the plurality of users; and
   e. repeating steps (c)–(d) if another predefined priority signal located at said resource request address is desired.

27. A method of granting access to a shared resource wherein the shared resource is accessed by a plurality of users, comprising the steps of:
   a. providing a plurality of resource request signals wherein each of the plurality of resource request signals is provided by one of the plurality of users and wherein each of the plurality of resource request signals has a plurality of information bits; the plurality of resource request signals indicating that a corresponding one of the plurality of users desires access to the shared resource and the plurality of information bits of each of the plurality request signals indicating the urgency of the corresponding one of the plurality of users access to the shared resource; and b. combining predetermined ones of the plurality of resource request signals provided in step (a) to form a resource request address, including the plurality of information bits of each of the plurality of resource request signals, and providing said resource request address to a look-up table wherein said look-up table provides a predefined priority signal to each of a plurality of priority response signals, wherein each of said plurality of priority response signals is coupled to selected one(s) of the plurality of users.

28. A method of granting access to a shared resource wherein the shared resource is accessed by a plurality of users, each of the plurality of users having a corresponding priority input for granting priority to the corresponding user, comprising the steps of:

a. providing a plurality of resource request signals wherein each of the plurality of resource request signals is provided by a corresponding one of the plurality of users indicating that the corresponding user desires access to the shared resource;

b. providing a look-up table wherein the look-up table has an address input and a plurality of address locations;

c. loading each of said plurality of address locations of said look-up table with a plurality of predetermined values;

d. concatenating said plurality of resource request signals provided in step (a) thereby forming a resource request bus address; coupling the resource request bus address to the address input of the look-up table thereby selecting one of the plurality of address locations in the look-up table;

e. providing a corresponding one of the plurality of predetermined values located at the selected address location of the look-up table to a corresponding one of the priority inputs of the plurality of users thereby granting priority to one of the plurality of users to use the shared resource; and f. repeating steps (c)–(e) if another corresponding one of the plurality of predetermined values located at the selected address location of the look-up table is desired.

\* \* \* \* \*